United States Patent
Vesely

(10) Patent No.: US 12,441,380 B2
(45) Date of Patent: Oct. 14, 2025

(54) ELECTRIC WHEELBARROW CONVERSION KIT

(71) Applicant: ELIFE LLC, Darnestown, MD (US)

(72) Inventor: Ivan Vesely, Darnestown, MD (US)

(73) Assignee: ELIFE LLC, Darnestown, MD (US)

( * ) Notice: Subject to any disclaimer, the term of this patent is extended or adjusted under 35 U.S.C. 154(b) by 0 days.

(21) Appl. No.: 18/489,387

(22) Filed: Oct. 18, 2023

(65) Prior Publication Data

US 2024/0132128 A1 Apr. 25, 2024
US 2024/0227891 A9 Jul. 11, 2024

Related U.S. Application Data

(60) Provisional application No. 63/417,842, filed on Oct. 20, 2022.

(51) Int. Cl.
*B62B 1/20* (2006.01)
*B62B 5/00* (2006.01)

(52) U.S. Cl.
CPC ............... *B62B 1/20* (2013.01); *B62B 5/005* (2013.01)

(58) Field of Classification Search
CPC .................................. B62B 1/20; B62B 5/005
See application file for complete search history.

(56) References Cited

U.S. PATENT DOCUMENTS 5,211,254 A * 5/1993 Harris, III ............. B62B 5/0026
280/47.23
5,350,030 A * 9/1994 Mawhinney .............. B62B 1/24
180/215

(Continued)

OTHER PUBLICATIONS

L-Faster 36V 48V 350W 500W Wheelbarrow Cart Gear Hub Motor Kit Off Road 14.5 Inch Wheel. L-Faster [retrieved from amazon.com on 2024-03-21]. Retrieved from the Internet: < URL: https://www.amazon.com/L-faster-350W-Wheelbarrow-Motor-Wheel/dp/B0BYHLTFPQ/ref=sr_1_5?crid=2UNIHLM8BH8NC&dib=eyJ2ljoiMSJ9.0BMNu3RaUoRo8_dwNZv34k0xglZnbOlcr5rgg-JRsw74RAx3rgb9nlh-7GL1_M1Flsl|DOUN6p6zHFSvjW9Cwc9G PGoEFR2bNHegLPRIHtF4WVbJwyhbqZ626zmuEt_sKbitaY bF9x4zD-n6M_gqEC1dAhPhssA2sTE5h3x6JxFkTmJ6TpZiNbHA hQ8HRE8apTbucZweoWDff1XCVdXKmkTNWA_pmz9G79Kq6I A8JkRKQ1SuTocLHybiftqi50GW1gWG2srK3RELbRlqfmO62Qs FfIXD1b02dBkCZQdc6Zt_dE.uOZ4Q0sB7avsSGnluet4FcaVs6Z3-Ciu 1NSF9kYyxqE&dib_tag=se&keywords=electric% 2Bwheelbarrow%2Bkit&qid=1710789168&spre_fix=electric% 2Bwheelbarrow%2Bkit%2Caps%2C91&sr=8-5&th=1>.

(Continued)

*Primary Examiner* — Jeffrey J Restifo
(74) *Attorney, Agent, or Firm* — RENNER, OTTO, BOISSELLE & SKLAR, LLP

(57) ABSTRACT

A system for converting an existing hand push wheelbarrow to a powered wheelbarrow by way of a single unit kit that comprises a motorized wheel, a battery, and all other necessary electrical components. The system includes wheel brackets with mounting holes sized to fit most standard wheelbarrows, so that the original passive wheel can be easily removed, and the Kit installed using the same mounting hardware. The larger of the two mounting brackets supports the component case with the battery and the motor controller, and acts as the heat sink for all the heat generating electronics within the case. This enables the entire system to be sealed and waterproof. The Kit is intended to be used in situations where heavy loads need to be transported by wheelbarrow over bumpy ground or up inclines, and motorized assistance to propel the wheelbarrow may be needed.

16 Claims, 18 Drawing Sheets

(56) References Cited

U.S. PATENT DOCUMENTS

| | | | | |
|---|---|---|---|---|
| 5,465,801 | A * | 11/1995 | Hoover | B65D 51/06 |
| | | | | D34/16 |
| 5,489,000 | A * | 2/1996 | Hillbohm | B62B 1/18 |
| | | | | 180/19.1 |
| 5,878,827 | A * | 3/1999 | Fox | B62D 51/04 |
| | | | | 180/19.1 |
| 6,065,555 | A * | 5/2000 | Yuki | B65B 5/0026 |
| | | | | 180/19.1 |
| 6,745,859 | B2 * | 6/2004 | Simons | B62B 5/005 |
| | | | | 180/19.1 |
| 7,775,306 | B1 * | 8/2010 | Adkins | B62B 5/0026 |
| | | | | 180/19.3 |
| 8,869,922 | B1 * | 10/2014 | Isola | B62B 5/003 |
| | | | | 180/19.1 |
| 8,997,903 | B2 * | 4/2015 | Vandelinde | B62B 1/18 |
| | | | | 180/19.1 |
| 9,108,690 | B2 * | 8/2015 | Rowlands | B62D 51/04 |
| 9,120,499 | B2 * | 9/2015 | Michel, Jr. | B62B 5/0036 |
| 9,796,401 | B1 * | 10/2017 | Ammirati | B62B 5/005 |
| 9,932,059 | B1 * | 4/2018 | Kruppa | F16D 65/02 |
| 10,099,732 | B2 * | 10/2018 | Ho | B62B 5/0026 |
| 10,683,023 | B1 * | 6/2020 | Cook | B62B 5/0066 |
| 11,400,967 | B2 * | 8/2022 | Simons | B62B 3/00 |
| 2003/0178801 | A1 * | 9/2003 | Hart | B62B 1/20 |
| | | | | 280/47.371 |
| 2007/0079998 | A1 * | 4/2007 | Walter | B62B 1/20 |
| | | | | 180/19.1 |
| 2021/0284222 | A1 * | 9/2021 | Makarovic | B62B 5/0053 |
| 2024/0132128 | A1 * | 4/2024 | Vesely | B62B 5/005 |

OTHER PUBLICATIONS

Szwedi Wheelbarrow Electric Motor Kit 400-8inch Tire Hauling Garden 5km/h-7km/h Speed 36V230W 97N.M Torque Reverse Function Single Wheel Disc Brake for Utility Cart. SZWEDI [retrieved from amazon.com on 2024-03-21]. Retrieved from the Internet: <URL: https://www.amazon.com/SZWEDI-Wheelbarrow-Electric-400-8inch-Function/dp/B0CJ2R11L9/ref=sr_1_6?crid=2UNIHLM8BH8NC&dib=eyJ2ljoiMSJ9.0BMNu3RaUoRo8dwNZv34k0xglZnbOlcr5rqq-JRsw74RAx3rgb9nlh-7GL1_M1FIsIIDOUN6p6zHFSviW9Cwc9GPGoEFR2bNHegLPRIHtF4WVbJwyhbaZ626zmuEt sKbitaY bF9x4zD-n6M_gqEC1dAhPhssA2sTE5h3x6JxFkTmJ6TpZiNbHAhQ8HRE8apTbucZweoWDff1XCVdXKmkTNWA pmz9G79Kq6IA8jkRKQ1SuTocLHybiftqi50GW1gWG2srK3RELbRlqfmO62QsFfIXD1b02dBkCZQdc6ZtdE.uOZ4Q0sB7avsSGnluet4FcaVs6Z3-Ciu 1NSF9k YyxqE&dib_tag=se&keywords=electric+wheelbarrow+kit&gid=1710789168&sprefix=ele ctric+wheelbarrow+kit,aps,91&sr=8-6>.

F-Faster Dual Drive Electric Cart Conversion Kit Easy Carry 200kg 8 Inch Wheel Set for DIY Electrical Pull Barrow Trolley Capacity 400lbs with Reverse. L-Faster [retrieved from amazon.com on March 21, 2024].

L-Faster 24V 36V 48V 350W Off Road Rough Tyre 10 inch Wheel Electric Wheelbarrow Scooter Gear Hub Motor kit . L-Faster [retrieved from amazon.com on Mar. 21, 2024]. Retrieved from the Internet: <URL: https://www.amazon.com/Rough-Electric-Wheelbarrow-Scotter-throttle/dp/B0BXXC6N8R/ref=sr_1_9?crid=UNIHLM8BH8NC&dib=eyJ2ljoiMSJ9.0BMNu3RaUoRo8dwNZv34k0xglZnbOlcr5rgg-JRsw74RAx3rgb9nlh-7GL1_M1flsIDOUN6p6zHFSvjW9Cwc(GPGoEFR2bNHeglPRIHtF4WVbqZ626zmuEt_sKbitaYbF9x4zD-n6M_gqEC1dAhPhssA2sTE5h3x6JxFkTmJ6TpZiNbHahQ8HRE8apTbucZweoWDff1XCVdXKmkTNWApmz9G79Kq6IA8jkRKQ1SuTocLHybiftqi50GW1gWG2srK3RELbRIgfmO62QsFfIXD1b02dbkCZQdc6Zt.dE. uOZ4Q0sB7avsSGnluet4FcaVs6Z3-Ciu1NSF9kYyxqE&dib_tag=se&keywords=electric%2Bwheelbarrow%2Bkit&qid=1710789168&sprefix=electric%2Bwheelbarrow%2Bwheelbarrow%2Bkit%2Caps%2C91&sr=8-9&th=1.

L-Faster 10 Inch 48V 500W Chain Drive Wheelbarrow Trolley Brushless Geared Motor Wheel Kit. L-Faster [retrieved from amazon. com on 2024-03-21]https://www.amazon.com/Rough-Electric-Wheelbarrow-Scotter-throttle/dp/B0BXXC6N8R/ref=sr_1_9?crid=UNIHLM8BH8NC&dib=eyJ2ljoiMSJ9.0BMNu3RaUoRo8dwNZv34k0xglZnbOlcr5rgg-JRsw74RAx3rgb9nlh-7GL1_M1flsIDOUN6p6zHFSvjW9Cwc(GPGoEFR2bNHeglPRIHtF4WVbqZ626zmuEt_sKbitaYbF9x4zD-n6M_gqEC1dAhPhssA2sTE5h3x6JxFkTmJ6TpZiNbHahQ8HRE8apTbucZweoWDff1XCVdXKmkTNWApmz9G79Kq6IA8jkRKQ1SuTocLHybiftqi50GW1gWG2srK3RELbRIgfmO62QsFfIXD1b02dbkCZQdc6Zt.dE. uOZ4Q0sB7avsSGnluet4FcaVs6Z3-Ciu1NSF9kYyxqE&dib_tag=se&keywords=electric%2Bwheelbarrow%2Bkit&qid=1710789168&sprefix=electric%2Bwheelbarrow%2Bwheelbarrow%2Bkit%2Caps%2C91&sr=8-9&th=1.

Screen capture from YouTube video clip entitled "First Cut of Grin's Electric Wheelbarrow Kit," uploaded Jul. 18, 2021 by user "Grin Technologies." Retrieved from Internet on Mar. 21, 2024 URL: <https://www.youtube.com/watch?v=WFv62Y8isO4>.

Barebones Electric Wheelbarrow Conversion Kit. Grin Technologies Faster retrieved from Internet on Mar. 21, 2024. Retrieved from the Internet: <URL: https://ebikes.ca/shop/electric-bicycle-kits/basic-electric-wheelbarrow-conversion-kit.html>.

Advanced Electric Wheelbarrow Conversion Kit. Grin Technologies Faster [retrieved from Internet on Mar. 21, 2024]. Retrieved from the Internet: <URL: https://ebikes.ca/shop/electric-bicycle-kits/advanced-electric-wheelbarrow-conversion-kit.html>.

* cited by examiner

ELECTRIC WHEELBARROW CONVERSION KIT

RELATED APPLICATIONS

This application claims the benefit of U.S. Provisional Application No. 63/417,842, filed Oct. 20, 2023, which is hereby fully incorporated herein by reference.

FIELD OF THE INVENTION

The present invention relates generally to the field of motorizing an existing manual hand push (non-powered) wheelbarrow with a conversion kit.

BACKGROUND OF THE INVENTION

Wheelbarrows are used widely in construction and in home gardening projects for moving soil, bricks or other heavy items between sites. The common wheelbarrow can roll easily on level ground, but it can be difficult to push up a gentle incline or over bumpy ground.

It would be advantageous to wheelbarrow users to have a powered device that can be easily controlled by a thumb throttle or similar. Indeed, there are a number of electrically powered wheelbarrows available on the market. These units, however, are (i) very expensive, (ii) come shipped disassembled in large cartons and need to be assembled prior to use, and (iii) consist of many individual pieces that need to be somehow put together, often with significant modifications to the wheelbarrow to make them fit.

As an alternative less expensive kits are available, typically made in China, that contain all the electrical components, but require the user to somehow connect all the components together and to the wheelbarrow to make the system work, and often require significant modification to the wheelbarrow, such as welding of metal brackets or drilling mounting holes. Clearly, this is unacceptable for the average consumer.

While the expensive units may be appealing to a garden hobbyist, the lawncare companies that typically have several workers using them at a time are more concerned about price. With regard to the second less expensive option, the time, labor and expertise involved in assembling the various pieces into a functional unit may also be daunting for users with modest technical skills. Moreover, most individuals that need a wheelbarrow already have one. It is thus difficult to justify throwing out a perfectly good wheelbarrow to buy a new one just for the purpose of motorizing it.

A more attractive proposition from an economic and ecological perspective is to retrofit an existing non-powered wheelbarrow with an electrically driven wheel and power source. An ideal system would be a kit that is simple to install and contains all the necessary components in a single package that is waterproof and fits most wheelbarrows sold in the U.S.

The present invention discloses a single unit, electric wheelbarrow conversion kit that replaces the passive wheel of existing wheelbarrows without the need of drilling mounting holes or modifying the underlying structure of the wheelbarrow itself. The conversion kit contains all the components in a single package that bolts onto the wheelbarrow using the existing mounting holes through which the original wheel was attached to the wheelbarrow.

The single unit conversion kit is made possible by the discovery that the majority of the wheelbarrows sold in the United States make use of the same pattern of mounting holes for the passive wheel. By using the pattern of holes common to most wheelbarrows on the market, a universal conversion kit can thus be implemented and installed on the majority of wheelbarrows sold in the U.S., regardless of their make and other distinguishing features.

The most common difference between the wheelbarrows of different makes is the material used for the two main arms. Some wheelbarrows have arms that are made of wood, others are made of metal, and each has slightly different grab handles at their ends. In order to control the speed of the motor, the conversion kit also comprises of a thumb throttle that is mounted on the wheelbarrow handle. In order to be compatible with the different sizes and diameters of the handle grips, the thumb throttle comprises a novel mount that can accommodate the different styles, sizes and materials of handles used on the various brands and designs of wheelbarrows.

SUMMARY OF THE INVENTION

The present invention is directed to an electric wheelbarrow conversion kit comprising one or more mounting brackets, a wheel with an integrated electric motor, a component case assembly that comprises a case housing containing a battery, a motor controller and all the related electronics packaged into a single unit that is mounted to the wheelbarrow via the one or more mounting brackets, said mounting brackets (i) making use of the existing mounting holes in the wooden frame of the wheelbarrow, (ii) being adaptable to different patterns of mounting holes, (iii) protecting the component case assembly from impact damage, and (iv) acting as a heat sink for the internal electrical components. Having the bracket act as the heat sink enables the case housing to be completely sealed and thus waterproof. The kit also comprises a thumb throttle connected to the component case assembly via a cable that is mounted on the existing side arms of the wheelbarrow.

The motorized wheel comprises a electrically powered motor, preferably a brushless motor powered by direct current (BLDC motor), preferably having a central shaft fitted with electrically activated electromagnets that sequentially attract and repel permanent magnets in the rotor, positioned circumferentially around the stator, thus causing the rotor to rotate around the stator. The BLDC motor is preferably geared down so as to multiply the torque of the motor and reduce its speed to an amount suitable for slow moving vehicles. The geared BLDC motor preferentially rotates at a speed suitable for moving the wheelbarrow from a standstill to a rapid yet conformable run, appropriate for an empty or laden wheelbarrow. For an exemplary motor configuration where the motorized wheel has a 14 inch diameter, the maximum speed of the motor should be no more than 300 revolutions per minute.

The rotor is preferably made of metal for strength and durability, having two spaced apart rims between which a tire is disposed. The tire can be of a conventional configuration having a tube, or being tubeless where the outer bead surfaces of the tire seal against the inner rim surfaces of the motor and thus provide a toroidal volume filled with pressurized air. In an alternative embodiment, the tire can be made of solid, porous or perforated rubber or polymeric material and can be fitted on the motor using a press-fit technique as is well-understood in the field of solid or airless tires.

The central shaft of the motor stator is preferably fitted a threaded outer surface enabling it to be attached to the brackets of the conversion kit using conventional threaded nuts and washers, and tightened in place. Being non-rotating, the central shaft of the stator is preferably hollow in at least one direction from its central region allowing the necessary electrical cables to pass from the interior of the motor to the exterior, so as to deliver electrical energy from the external electronics to the internal motor magnets, and electrical signals from the internal motor sensors out to the external electronics. The BLDC motor is preferably three phase requiring three power cables to drive it. The BLDC motor is preferably fitted with Hall sensors that deliver position information of the magnets to the external electronics so that power can be delivered to the internal motor magnets in the correct sequence, and these Hall sensors commonly require five conductors. The BLDC motor thus usually requires three conductors for power and five conductors for position, and these conductors pass through the hollow portion of the central stator shaft.

The central shaft of the motorized wheel is mounted to at least one bracket, but preferably two, having one on each side of the wheel configured to accept the central shaft that emerges from each side of the wheel. Each bracket is comprised of a flat surface with a hole or slot sized to accept the central shaft, the flat surfaces are configured to accept the washers and nuts tightened against them to securely attach the shaft to the bracket. In a preferred embodiment, the brackets are made of sheet metal, such as aluminum or steel, having bends of the appropriate angle to accommodate the horizontal motor shaft and the vertical mounting holes of the wheelbarrow arms. In a preferred embodiment, the first bracket has a single bend to accommodate mounting of the right motor shaft to the right wheelbarrow arm, and the second bracket has multiple bends to accommodate mounting of the left motor shaft to the left wheelbarrow arm, as well as the component case assembly which includes the battery and other electronics.

In one embodiment, the left bracket comprises multiple mounting holes for the attachment of the case housing, and multiple bends in multiple planes to provide multiple flanges and metal surfaces for the purposes of protecting the component case assembly and any cables that emerge from it from impact and damage during use of the wheelbarrow in harsh environments where it can be subject to impact.

In one embodiment the left bracket comprises a first vertical surface for mounting the motor shaft, a first horizontal surface for mounting the bracket to the left wheelbarrow arm, the same first horizontal surface for mounting the battery case, a second vertical surface for protecting the component case assembly from frontal impact, and a second horizontal surface for protecting the component case assembly from impact from the bottom.

In another embodiment, the left bracket comprises a first vertical surface for mounting the motor shaft, a first horizontal surface for mounting the bracket to the left wheelbarrow arm, a second vertical surface for mounting the battery case to the bracket, a third vertical surface protecting the component case assembly from frontal impact, and a second horizontal surface for protecting the component case assembly from horizontal impact from the bottom.

In one embodiment the left and right brackets can have two arm mounting holes or slots for their attachment to the wheelbarrow arms. In an alternative embodiment, the left and right brackets can have three arm mounting holes or slots for their attachment to the wheelbarrow arms in order to provide a means of attachment to wheelbarrows with different bolt hole spacing.

The case housing can comprise one or more openings that face away from the supporting brackets for the purpose of assembly of components, and one or more openings that face towards the supporting brackets and enable internal electrical components to be directly attached to the metal brackets for the purpose of conducting heat away from the electrical components. Having the heat generating electrical components attached to the metal bracket enables the metal bracket to act as the heat sink to conduct heat away from the interior of the case housing to the outside, without the need for conventional heat sinks, as are commonly used in BLDC motor controllers.

BLDC motor controllers are typically provided in their own case with ridges or slots that act as the heat sink so as to conduct heat away from the internal electrical components to the outside. The conversion kit does away with the separate case for the motor controller and instead mounts the heat generating components of the motor controller to the metal brackets, enabling the motor controller to be positioned within the component case assembly which in turn enables a single waterproof case housing to be used for all the electrical components.

In a preferred embodiment, the case housing comprises a single opening for both assembly of components and the attachment of electrical components for the purpose of conducting heat away from the electrical components to the outside. In this preferred embodiment, the case housing does not require a second opening and a separate case lid with the associated gaskets and lid mounting holes.

The component case assembly may comprise a case housing, a battery, a BLDC motor controller, a power switch, a battery capacity meter, a charging port, ports for conductors or wires to enter or exit the case housing, and any other related mechanical and electrical components. In a preferred embodiment the case housing has multiple component holes for each of the components that pass through the wall of the case housing, and an open side so that internal components can attach to one of the metal brackets. In a preferred embodiment, the components that pass through the component holes in the case housing are fitted with gaskets so as to render the battery case waterproof. In a preferred embodiment, the open side of the case housing is fitted with mounting flanges and gasket for connection to the left metal bracket.

The kit preferably comprises a throttle or speed control unit configured to be mounted on one of the wheelbarrow handles and connected to the motor controller directly via wires, or indirectly via a wireless communication system such as BlueTooth. In a preferred embodiment the throttle can be operated with the thumb of one hand and thus be configured as a thumb throttle. Alternative embodiments can use finger operation and thus be configured as finger or trigger throttles.

The thumb throttle comprises a lever for setting the speed of the motor, internal electronics that sense the position of the lever and deliver a proportional signal to the motor controller, a housing configured to be fitted against one of the wheelbarrow handles and a mounting strap to secure the housing against the handle. The thumb throttle housing is preferably fitted with angled receiving surfaces that can adapt to a range of handle diameters ranging from ¾ of an inch to two inches. The thumb throttle housing can be secured to the handle with rigid mounting straps attached using screws, bolts and nuts, flexible mounting bands adjustable for length using Velcro or strap buckles, elastic mounting straps or similar means that continually provide a force between the thumb throttle housing and the wheelbarrow handle so that the housing does not turn, twist or in any way become loose against the handle. In a preferred embodiment, the receiving surfaces of the thumb throttle housing are fitted with friction enhancing features such as points, bump, pits or grooves.

The invention is preferably provided as a single piece conversion kit that can be connected to the wheelbarrow arms using the existing mounting holes and mounting nuts and bolts, with the thumb throttle connected to one of the arms using an elastic band that is adjustable to the diameter of the handle. In the preferred embodiment, no other connections between kit components are made and excess cable is secured to the wheelbarrow handle with straps.

The invention described herein allows the user to quickly remove the existing passive wheel brackets from the wooden or metal side arms or frame of a wheelbarrow, and mount the conversion kit onto the frame using the same holes and same bolts. The thumb throttle is mounted to the wheelbarrow handle using a non-slip clamping system that accepts variable diameter handles. The case housing, the mounting bracket and the electrical components are integrated in a novel way that enables the internal heat generated by the electronics to be dissipated from the case housing without the need for external heat sinks or vent holes that would compromise the waterproof capability of the system.

This Summary is provided to introduce a number of concepts in a simplified form that are described below in the Detailed Description section. This Summary is not intended to identify key features or essential features of the subject matter claimed, nor is it intended to be used to limit the scope of the subject matter claimed. For example, wooden arms of the wheelbarrow can be replaced by metal arms, and brackets made from sheet metal can be machined, molded or fabricated form solid materials such as metals, plastic or polymer, as long as they have the necessary strength and stiffness. A more extensive presentation of the features, details and advantages of the present invention as defined in the claims is provided in the following written description of the various embodiments of the invention and illustrated in the accompanying drawings.

DETAILED DESCRIPTION OF THE INVENTION

Figure 1:
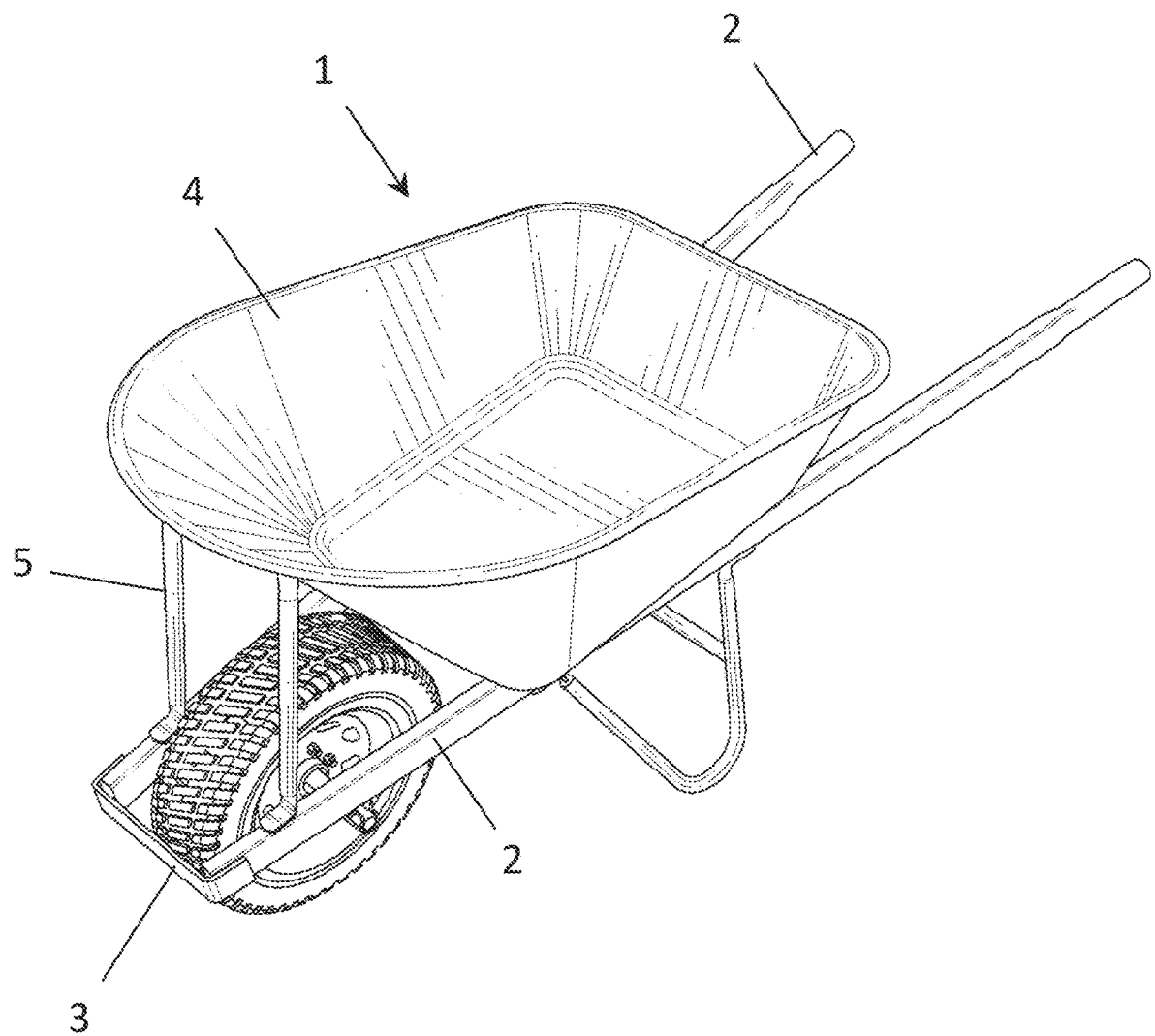
FIG. 1 is a perspective view of a conventional, non-powered wheelbarrow.

The electric wheelbarrow conversion kit is disclosed herein in conjunction with the accompanying figures. FIGS. 2 through 9 show the same invention from various aspects to provide the necessary detail to understand the configuration of the invention. The same figures show additional embodiments of the conversion kit with variations on the shape and configuration of the case, the bracket, and the mounting of the electrical components to them.

The electric wheelbarrow conversion kit 10 comprises a motorized wheel 11, a component case assembly 15 that includes a battery 12 and control electronics, two brackets 16 and 17 that respectively connect to the two arms 2 of the wheelbarrow 1, and a thumb throttle 18 that controls the speed of the motor.

It is understood that there are many wheelbarrow designs. However, in the exemplary embodiment, the conversion kit 10 is designed to be compatible with the most common style of wheelbarrow 1 containing two wooden or metal arms 2, joined at their apex with a bracket 3, and supporting a plastic or metal tub 4 (see FIG. 1). These types of wheelbarrows are essentially of the same design and are manufactured by Craftsman, Kobalt, Jackson, Westward and others.

Figure 2A:
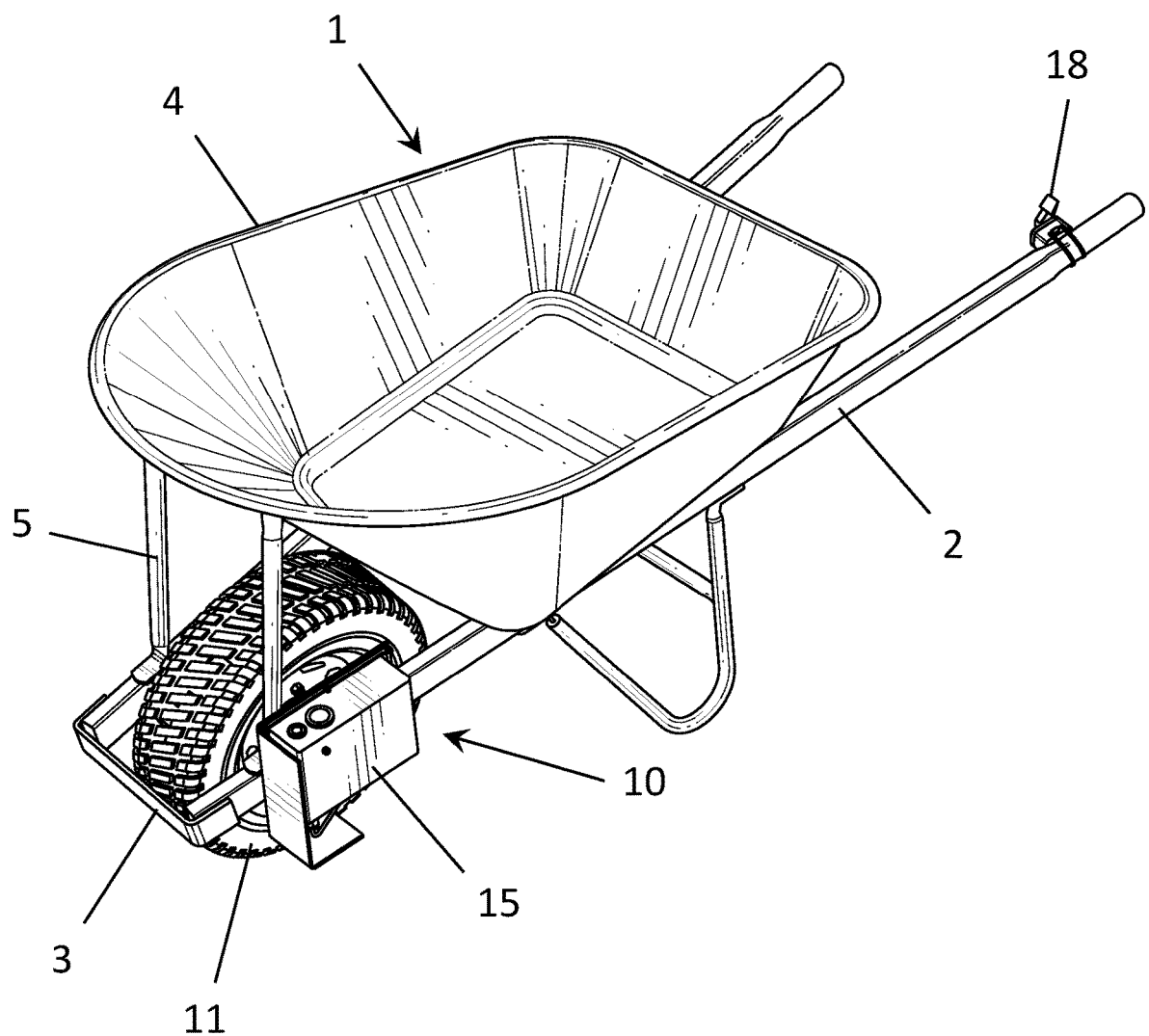
FIG. 2A is a perspective view of a wheelbarrow fitted with the conversion kit from the top front aspect.
Figure 2B:
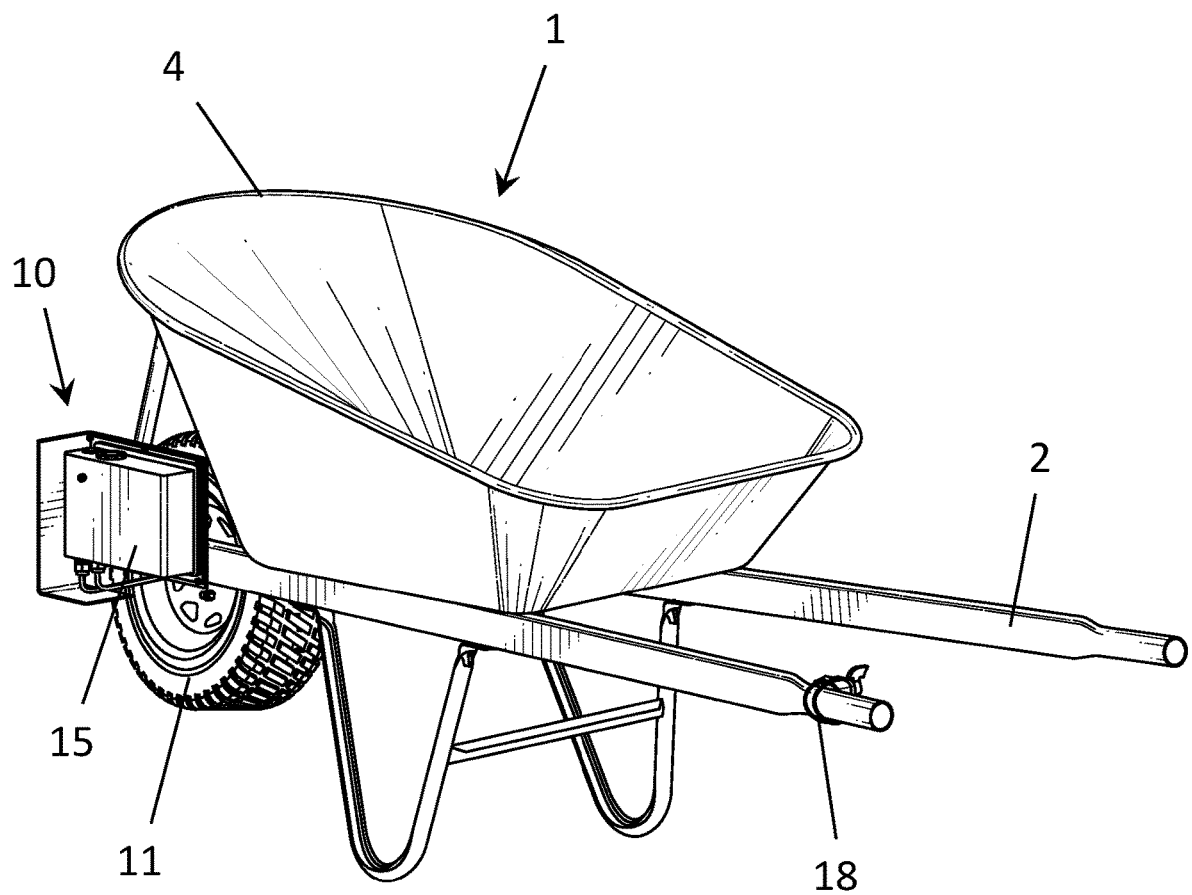
FIG. 2B is a perspective view of a wheelbarrow fitted with the conversion kit from the rear side aspect.
Figure 6:
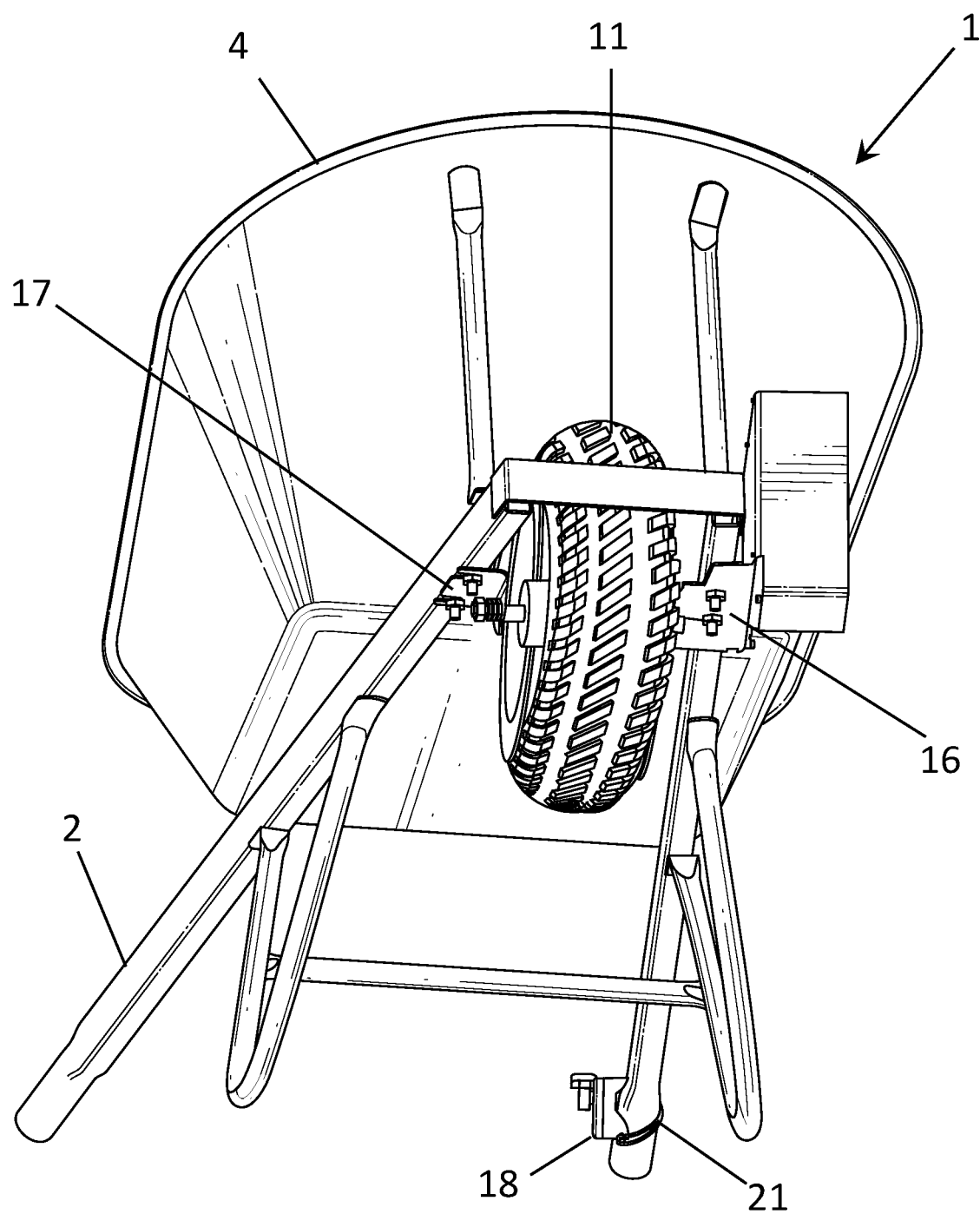
FIG. 6 is a perspective view from the bottom front, showing the electric wheelbarrow conversion kit brackets connected to the two wooden arms with 4 bolts, and the thumb throttle connected via the adjustable mounting strap.
Figure 7A:
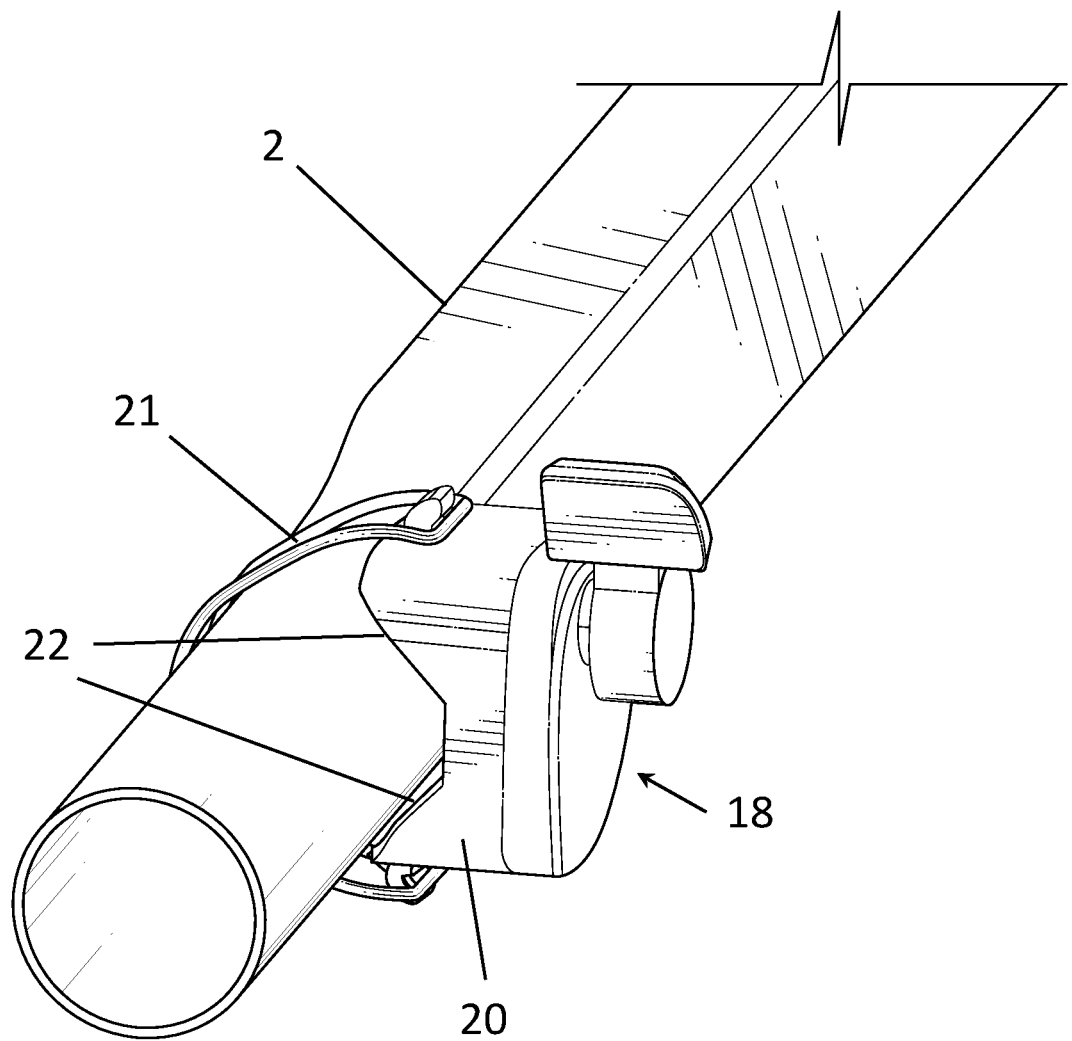
FIG. 7A is a perspective view of the thumb throttle mounted on the left arm of the wheelbarrow. Note the V-shaped mounting surface that enables the thumb throttle to be mounted on various diameter wheelbarrow handles, and the elastic mounting strap that holds it in place.
Figure 7B:
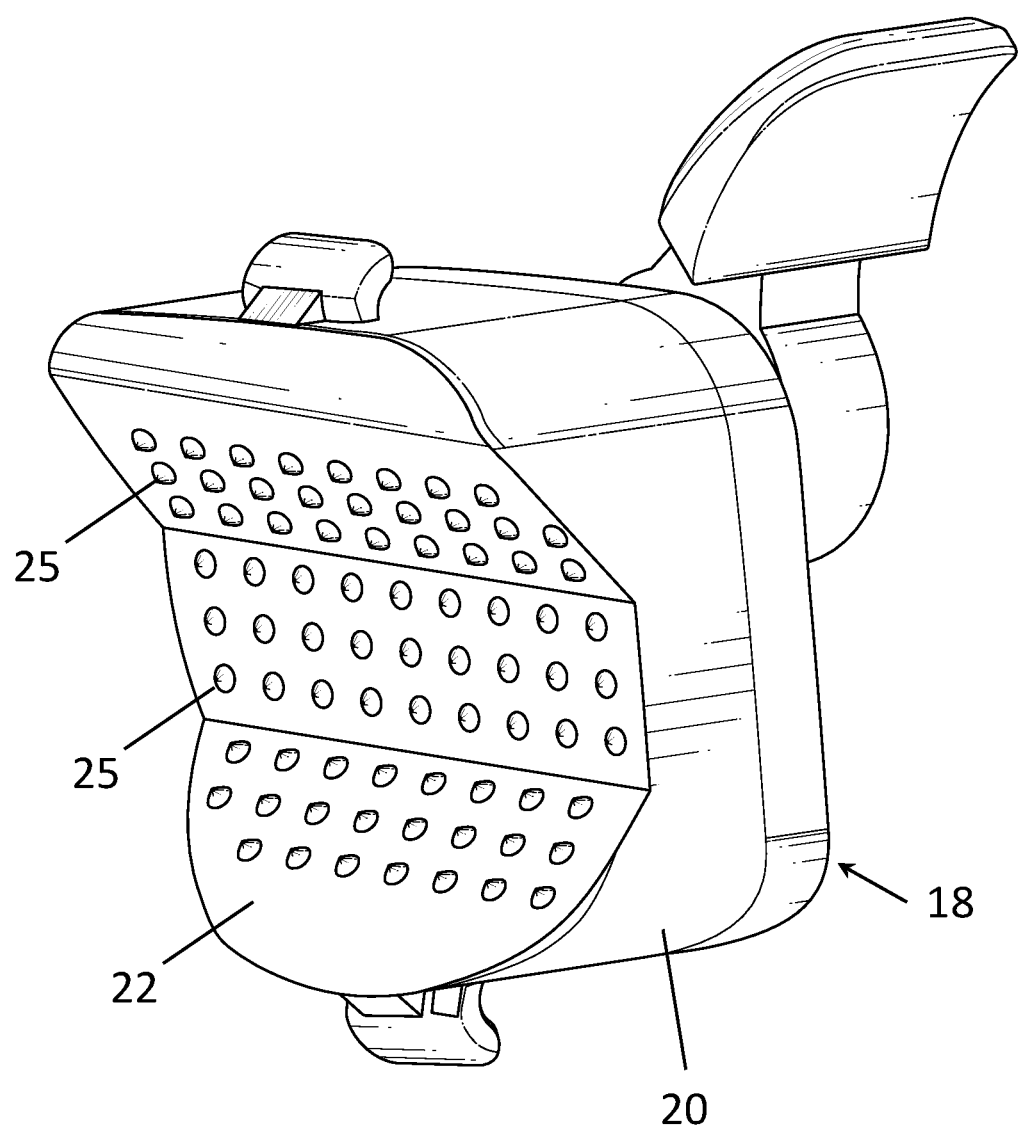
FIG. 7B is a perspective view of the thumb throttle, showing the V-shaped mounting surface that is fitted with numerous pointed projections that provide enhanced friction against the wood or other materials used for the handles of the wheelbarrow.

Some wheelbarrow designs come with the front braces 5 that support the metal tub 4, and some do not. Because the intent of the kit 10 is to be applicable to as many variations of this style of wheelbarrow as possible, the design of the kit 10 anticipates the presence of these braces and avoids interfering with them. Accordingly, the bulk of the kit components are housed within a case housing 26 of a component case assembly 15 that is positioned outboard of the arms 2, as shown in FIGS. 2 and 6.

The various embodiments of the electric wheelbarrow conversion kit 10 and its components, are shown in FIGS. 2 to 9. The motorized wheel 11 is preferably a compact hub motor with internal gears to reduce the speed of the motor and increase the torque that can be delivered. The hub motor rotates about a stationary motor shaft 8 to provide the traction force. The stationary shaft 8 is thus rigidly mounted to brackets 16 and 17 which are in turn mounted to the wheelbarrow arms 2. The motor shaft 8 is fitted into a shaft slot 7 in each of the brackets 16 and 17, sized to fit and tightened with nut 6 (see FIG. 3).

In one embodiment, one bracket 16 is larger and supports the component case assembly 15 that comprises a battery 12, a motor controller 13, and any other applicable electrical components such as a charging port for the battery 42, a battery capacity meter 41, and an on/off switch 40 for the system.

In one embodiment, the component case assembly 15 is mounted on the left bracket 16, which places all of the components, including the thumb throttle, on the left side of the wheelbarrow. It is understood that the component case assembly 15 can be positioned on the right side of the wheelbarrow simply by making the brackets and the relevant aspects of component case assembly 15 mirror images of each other. For the purposes of these illustrative images, and the preferred embodiment, the mounting bracket to which the component case assembly 15 is affixed is referred to as the left bracket 16, and the opposing mounting bracket that does not contain the component case assembly is referred to as the right bracket 17.

These two brackets are provided with arm mounting holes 9 or arm mounting slots 14 (see FIGS. 4 and 5) appropriately sized and spaced so that they can be mounted against the underside of the wheelbarrow arms 2, as shown in FIG. 6. It is advantageous to provide at least one of the brackets with arm mounting slots 14, instead of arm mounting holes, in the event that the commercially available wheelbarrow has assembly variations and the brackets need some positional adjusting during assembly.

Figure 4A:
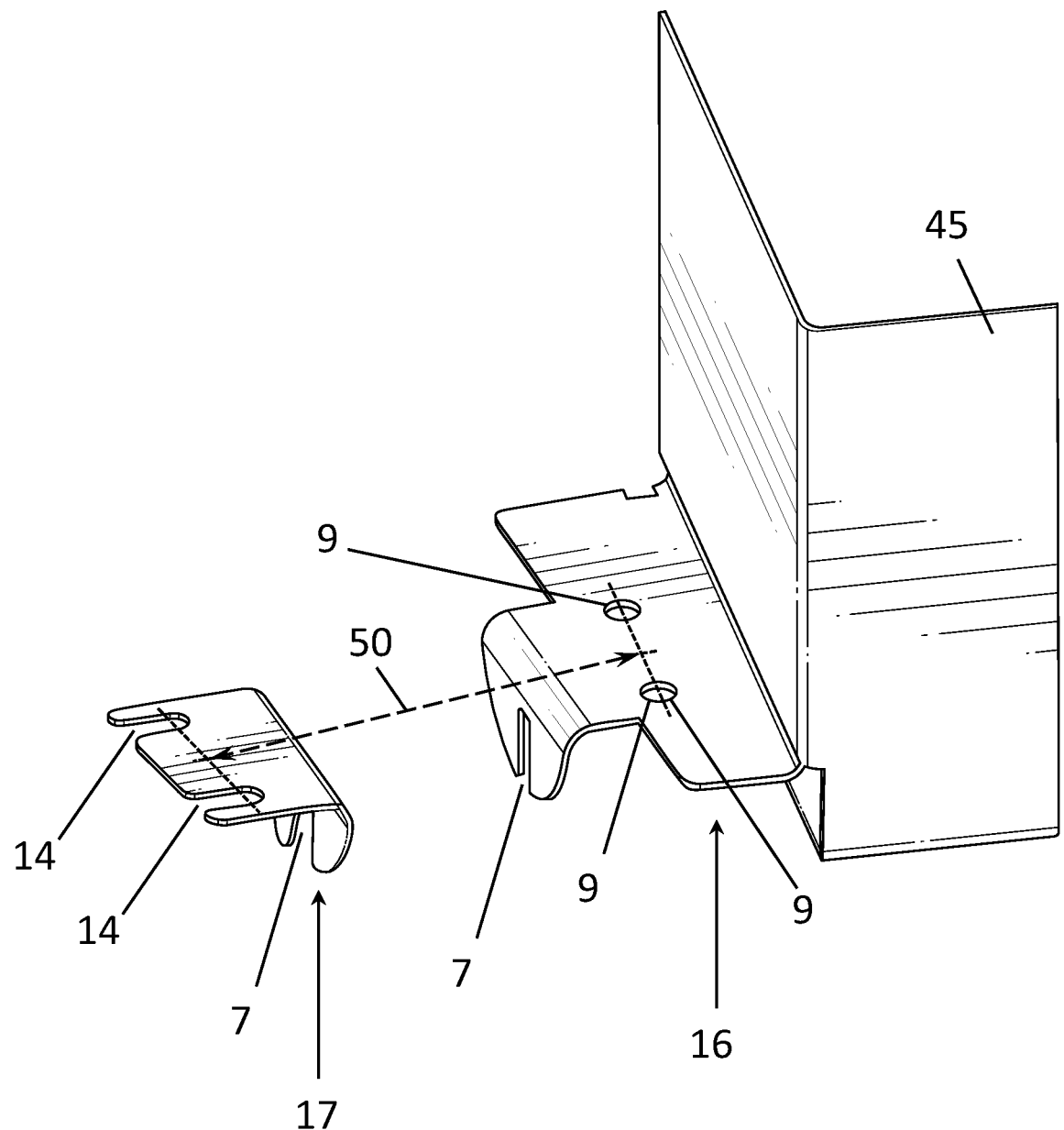
FIG. 4A is a perspective view of the electric wheelbarrow conversion kit mounting brackets from the top front aspect, showing the larger folded left bracket, and the smaller right bracket with arm mounting slots instead of arm mounting holes.
Figure 4B:
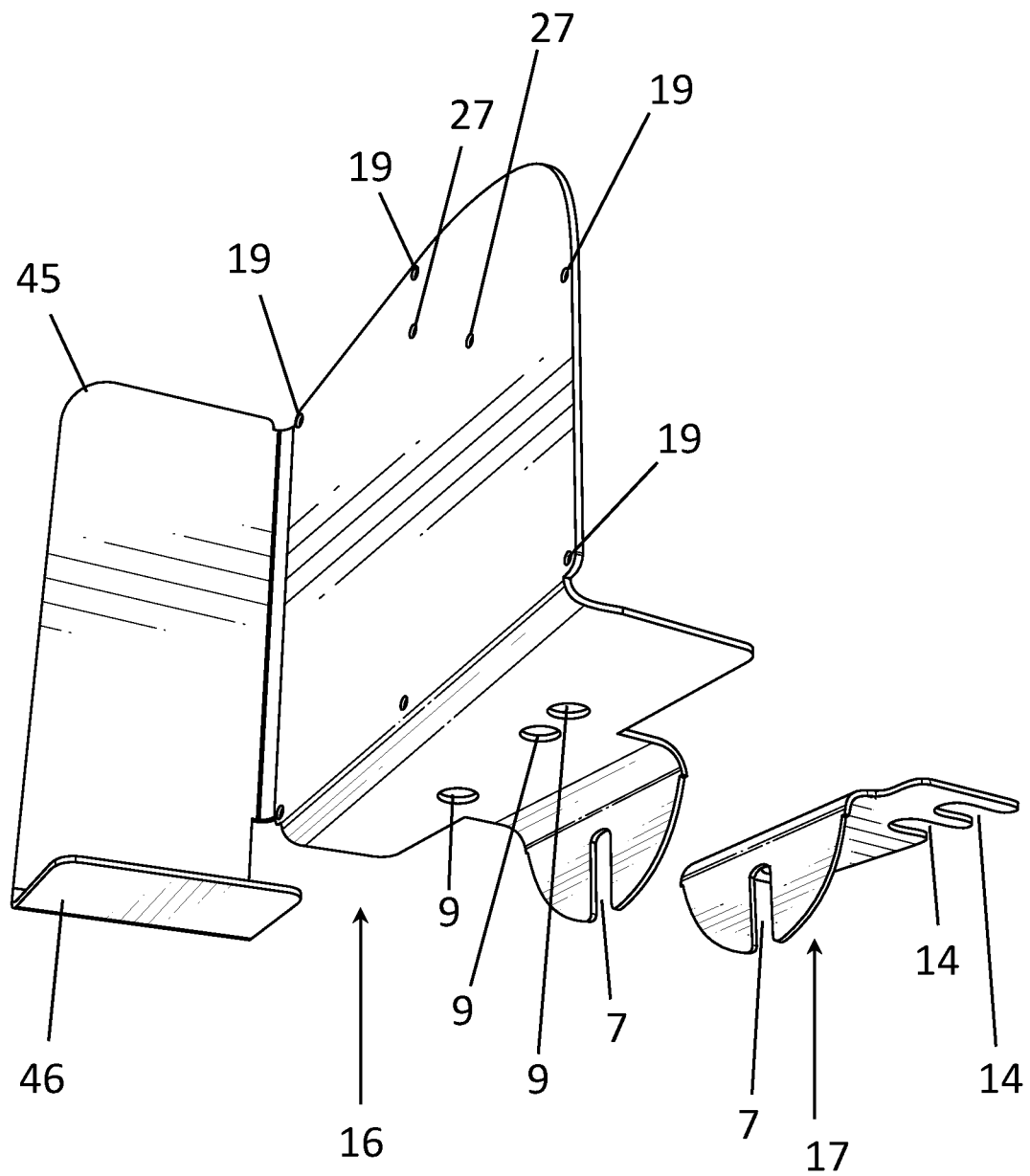
FIG. 4B is a perspective view of an alternative embodiment of the mounting brackets where each of the brackets have a third arm mounting hole or a third arm mounting slot to accommodate an alternative variant of a wheelbarrow with a different arm mounting bolt pattern.

The typical wheelbarrow is configured so that the bracket spacing 50 between the midpoint of the arm mounting holes 9 and the midpoint of the arm mounting slots 14 is about 9 inches (see FIG. 4A). The arm mounting slots 14 in one of the brackets are thus preferably about 1 inch long, providing an additional ½ inch of adjustability in each direction to accommodate any assembly variations in the typical wheelbarrow.

A detailed examination of the majority of the wheelbarrows available currently on the U.S. market has shown that there are two types of brackets. The first type has the mounting bolts on each side of the wheelbarrow arms about two and three eighths inches apart (2⅜"), and the second type has the mounting bolts about 3 inches apart. In order for a single conversion kit to accommodate these two variations, the preferred embodiment provides a left mounting bracket 16 with three arm mounting holes 9, and right mounting bracket 17 with three arm mounting slots 14 (see FIGS. 4B and 5B). The distance between the first and second arm mounting hole 9, or the first and second arm mounting slot 14, is preferably about two and three eighths inches, and the distance between the first and third arm mounting hole 9, or the first and third arm mounting slot 14, is about three inches. These are nominal distances from center to center. It is understood that holes and slots are typically slightly larger for ease of assembly and to accommodate manufacturing variations, but preferably no more than one eighth of an inch on either side of the bolt.

Figure 5A:
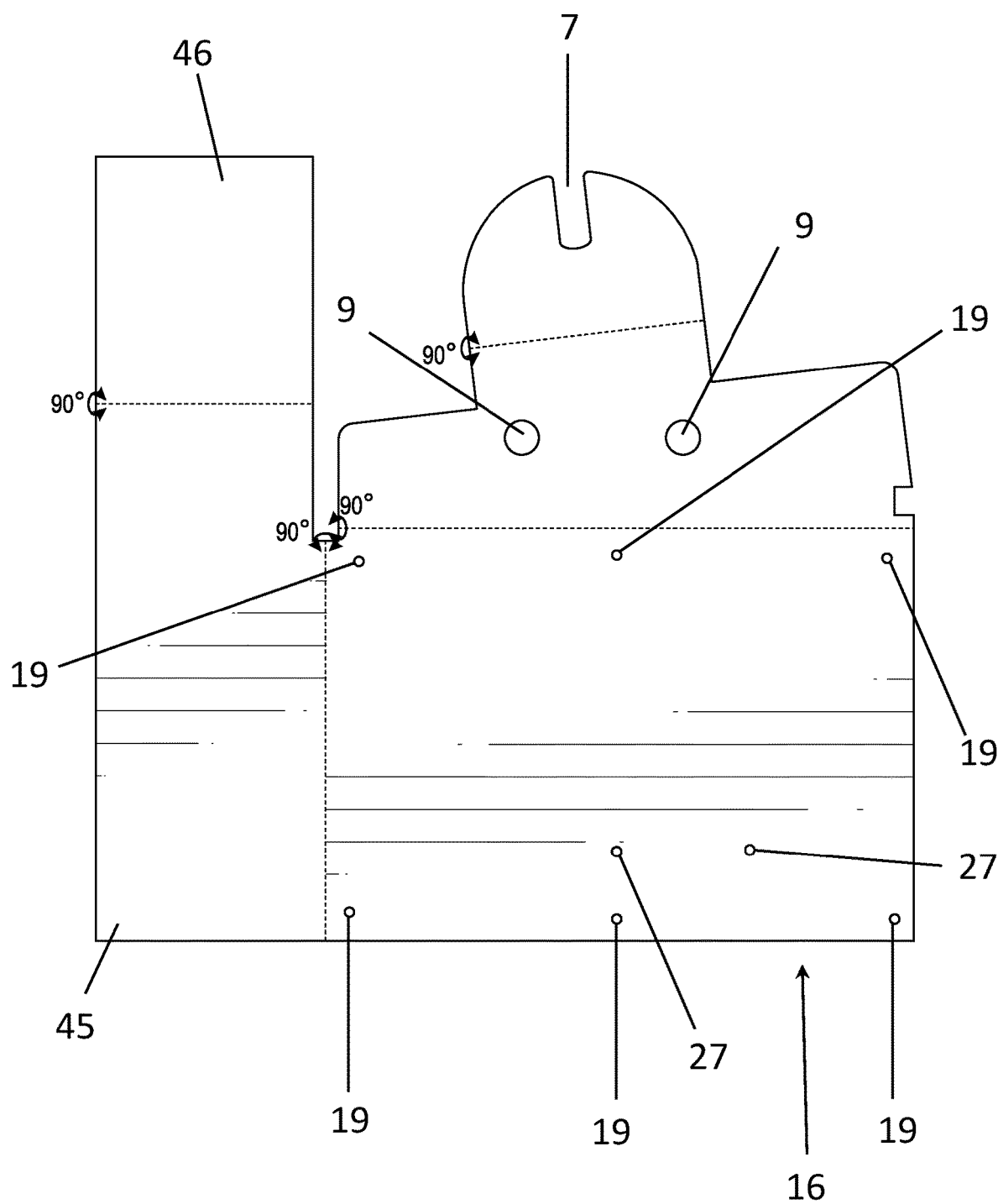
FIG. 5A is a flat pattern of the large left bracket of the first embodiment showing the shaft slot for the wheel shaft, the two arm mounting holes for mounting the left bracket to the wheelbarrow arms, the case mounting holes for attachment of the case housing to the left bracket, the accessory mounting holes, and the bend lines used during fabrication.
Figure 5B:
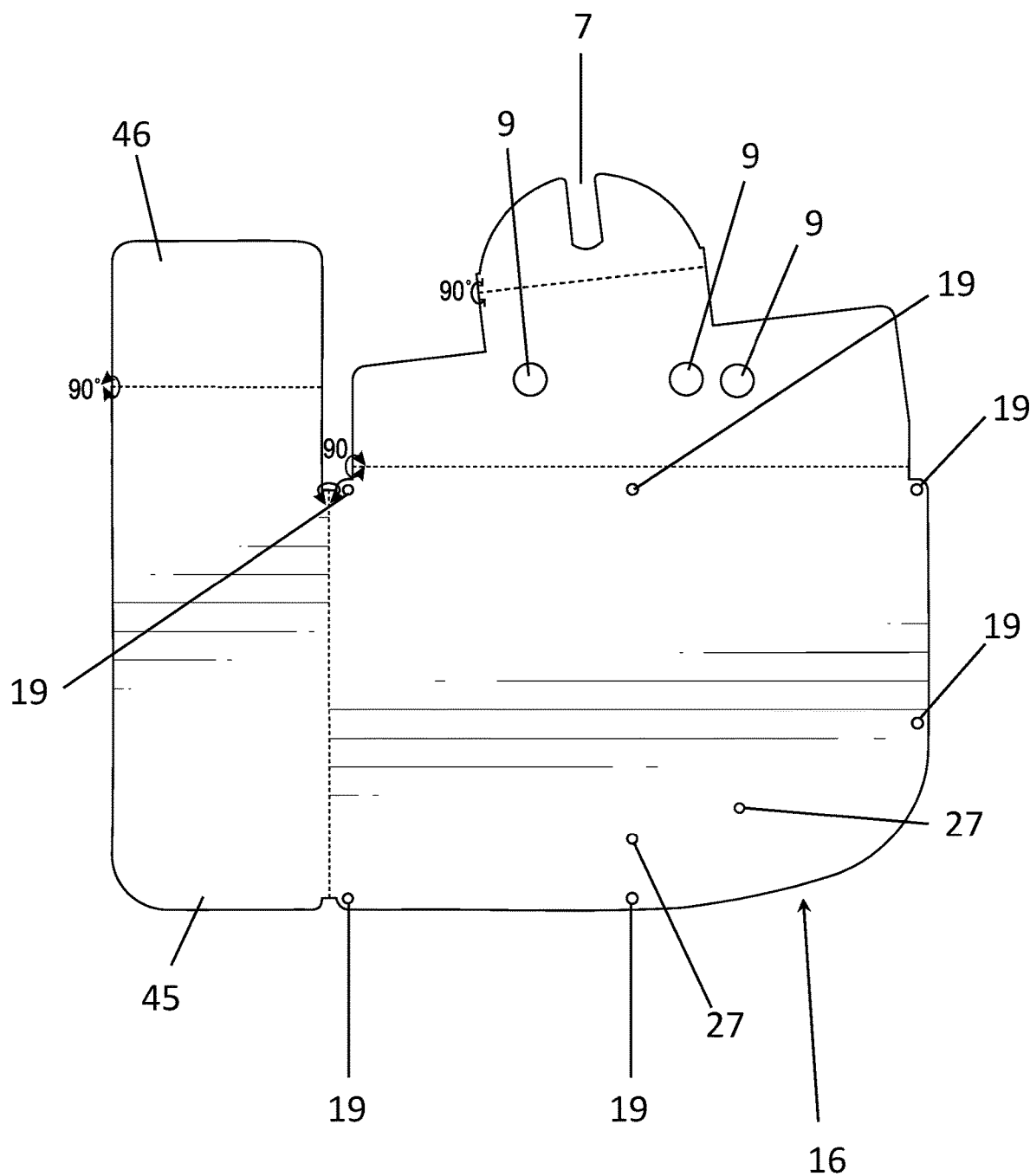
FIG. 5B is a flat pattern of the large left bracket of the second embodiment showing the shaft slot for the wheel shaft, the three arm mounting holes for mounting the left bracket to the wheelbarrow arms, the case mounting holes for attachment of the case housing to the left bracket, the accessory mounting holes, and the bend lines used during fabrication.

The left bracket 16 may also comprise additional holes such as case mounting holes 19 that facilitate the attachment of the case housing 26 to the bracket, and accessory mounting holes 27 that facilitate the attachment of its internal components directly to the bracket for the purpose of conducting heat from the internal electronics to the outside (see FIG. 5). These holes may be threaded for ease of mounting and assembly.

Figure 3A:
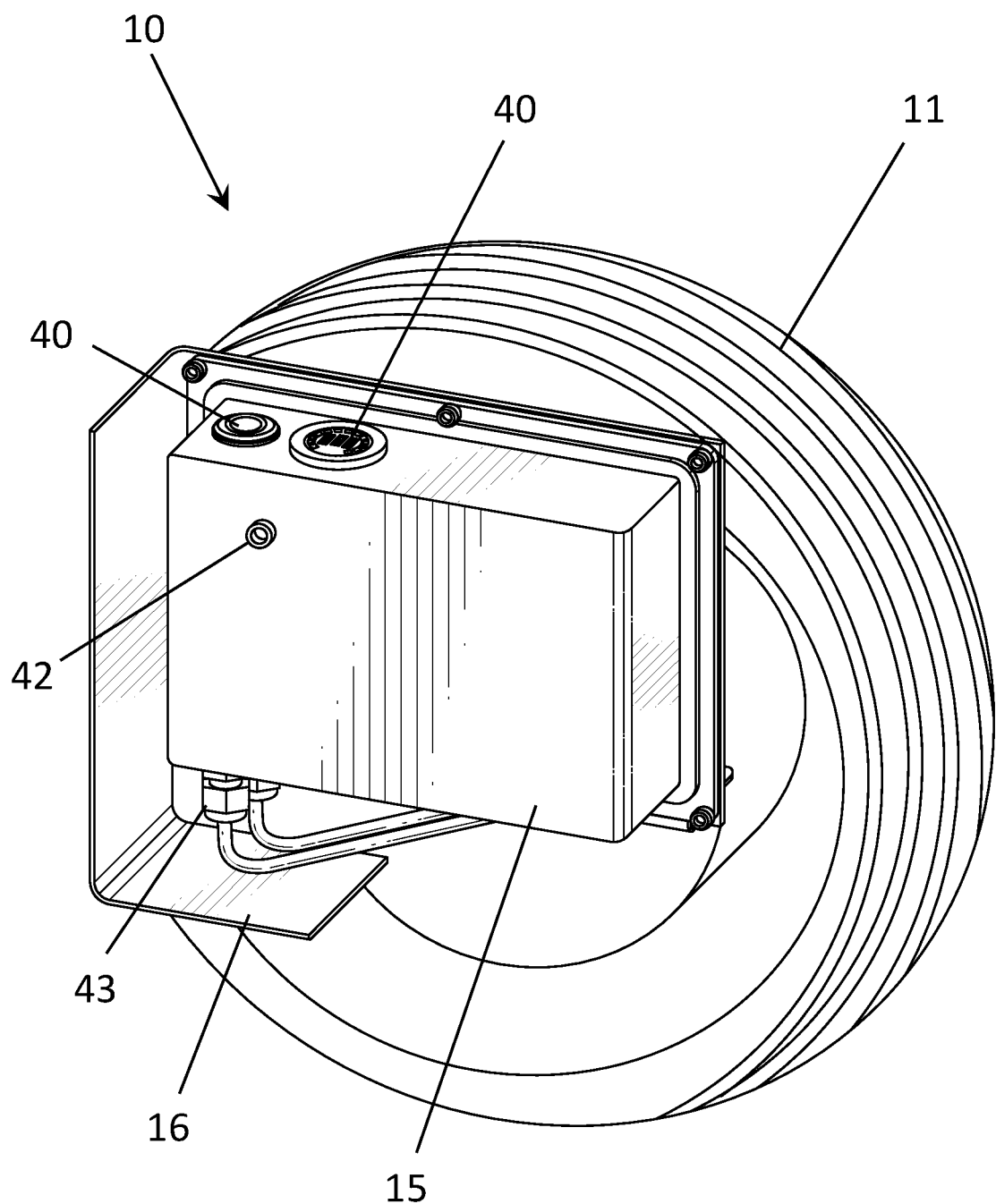
FIG. 3A is a perspective view of the electric wheelbarrow conversion kit from the left side, showing the folded bracket, the component case assembly and the powered wheel.
Figure 3B:
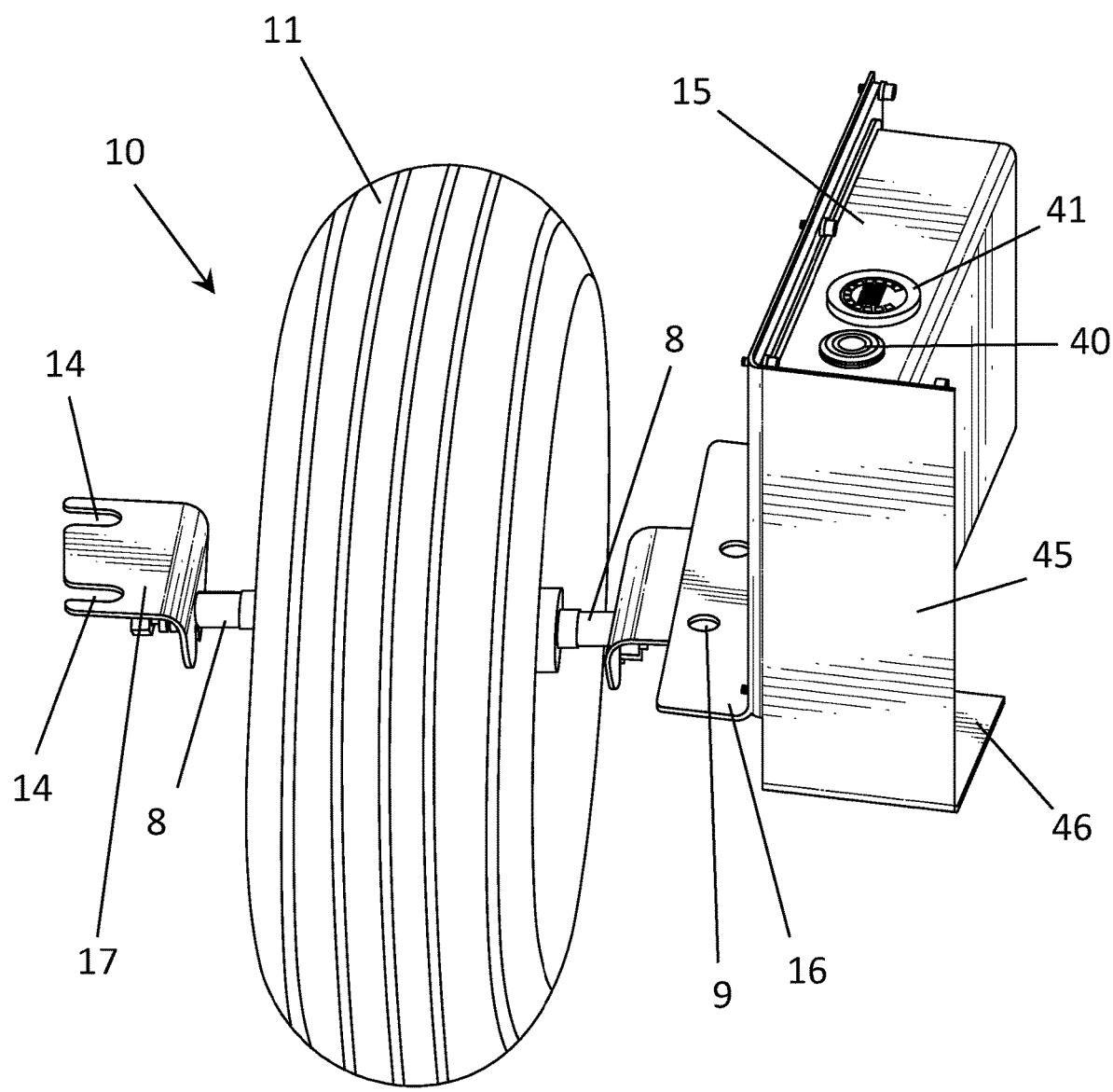
FIG. 3B is a perspective view of the electric wheelbarrow conversion kit from the top front aspect.
Figure 3C:
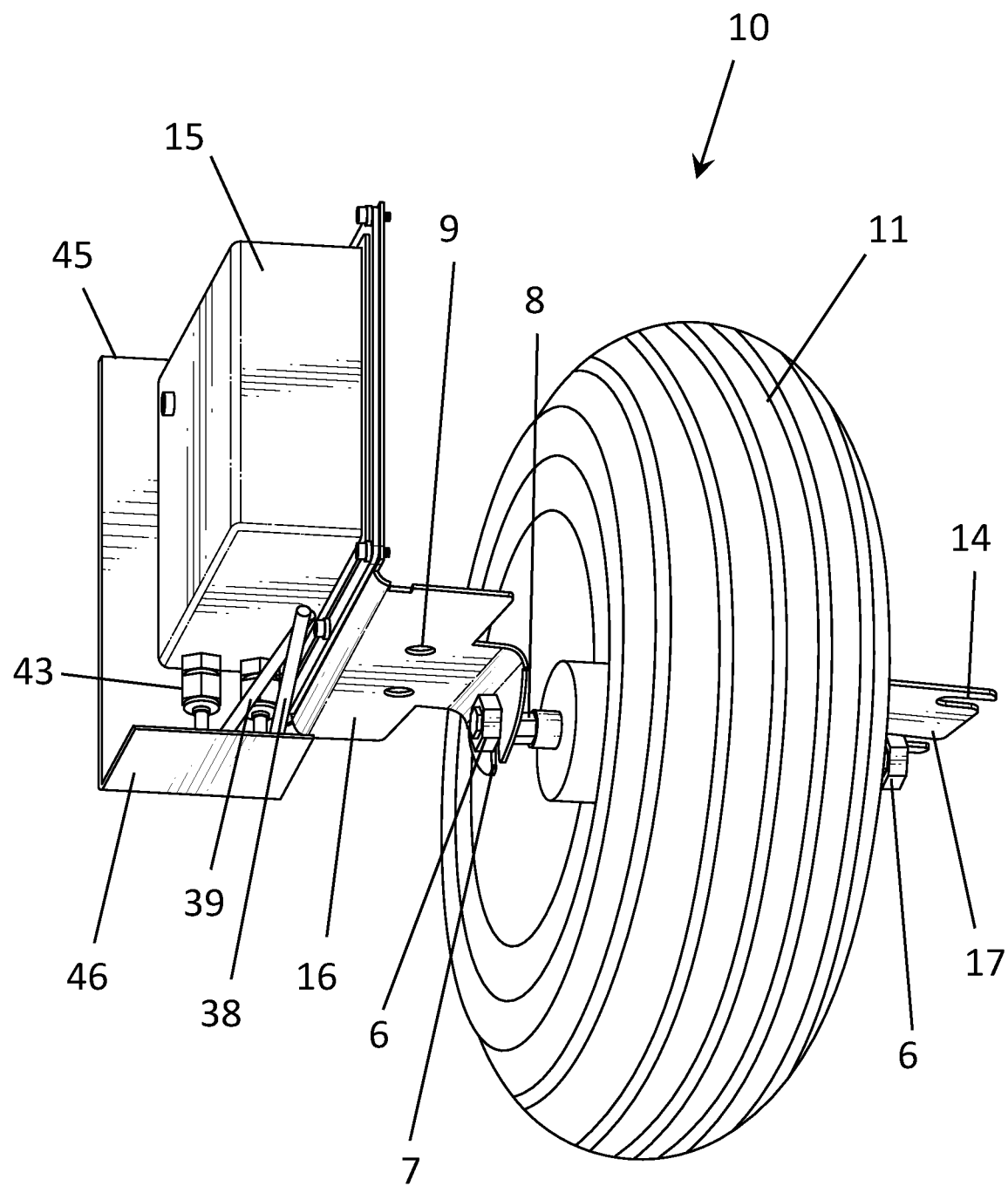
FIG. 3C is a perspective view of the electric wheelbarrow conversion kit from the bottom left rear aspect.

The conversion kit 10 is provided fully assembled with the two brackets 16 and 17 connected to the motorized wheel 11, as shown in FIG. 3. The conversion kit is also provided with a thumb throttle 18 (see FIG. 7), that can be mounted on one of the arms 2 of the wheelbarrow. The thumb throttle 18 is provided connected to the component case assembly 15 with a throttle cable 39. In the preferred embodiment the thumb throttle 18 is configured to be fitted to the left arm 2 of the wheelbarrow and thus operated by the left hand.

The thumb throttle 18 is based on existing commercially available thumb throttles used on eBikes or eScooters but adapted to be usable on the much thicker handles of wheelbarrows. The typical eBike thumb throttle makes use of the Hall effect approach to vary the output voltage in accordance to the position of the throttle lever. In brief, when a Hall effect sensor is connected to a 5 Volt source, the sensor detects the proximity of the magnet to the sensor itself. When the magnet is far away from the sensor, the output reading is 0 volts. As the magnet slowly gets closer to the sensor, the voltage gradually increases. A typical Hall effect throttle outputs a signal between about 0.9 V to 4.3V, when a 5 V source is applied. The motor controller recognizes this voltage range as corresponding to the full range of throttle from zero to maximum. In the exemplary embodiment shown in FIG. 7, the magnet rotates through an angle of about 90 degrees as the lever is depressed with the left thumb.

In order to use such commercially available thumb throttle devices, the mounting system needs to be adapted to fit not the ⅞" diameter tube of most bicycles and scooters, but rather the variable sizes of wheelbarrow handles, which can range from 1" to 1.5" in diameter. The modified thumb throttle thus comprises a custom fabricated housing 20 which can accommodate the larger and variable sizes of wheelbarrow handles (see FIG. 7). Instead of having the semi-circular shape to fit a ⅞" diameter handlebar tube of a bicycle, the disclosed thumb throttle housing 20 has a larger, "V" shaped mounting surface 22 that can accept the larger and variable size handles. The mounting strap 21 that affixes the thumb throttle housing 20 against the handle 2 can have the same "V" shaped mounting surface 22. In the preferred embodiment the mounting strap 21 is elastic. Further, the "V" shaped mounting surface 22 is fitted with a plurality of pointy projections 25 that can grip into the surface of the handle, provide enhanced friction, and limit rotation or movement of the thumb throttle 18 relative to the handle when in use. The "V" shaped mounting surfaces 22 pressed against the handle 2 with mounting strap 21 can accommodate a handle of variable diameter while still providing sufficient grip and eliminating rotation of the thumb throttle 18.

It is understood that the surface of the V shaped mounting surface 22 can be populated with any number of projections or features to enhance its grip, and the pointy projections 25 are shown for illustrative purposes only, and as the preferred embodiment.

The motorized wheel 11 is preferably powered by DC current from batteries 12 housed inside the component case assembly 15. The batteries are preferably lithium ion as they provide high power and are rechargeable. As battery technology continues to evolve, alternative, more advance battery chemistry may be used. The wheel motor is preferably a brushless direct current motor (BLDC), containing permanent magnets in the rotor that are driven by electromagnets on the stator. In hub motors, the stator is the inner component containing the shaft, and the rotor is the external component fitted with the tire, that spins around the stator. Brushless DC motors are driven to rotate by appropriate motor controllers that generate a rotating magnetic field in the stator. For application such as eBikes, the BLDC motors are fitted with Hall sensors that provide positional feedback to the motor controllers, enabling smooth acceleration. For accurate control of motor speed, the Electric Wheelbarrow Conversion Kit 10 further comprises a motor controller 13 that accepts the Hall sensor input from the motorized wheel 11. The motor cable 38 therefore enters the case housing 26, along with the throttle cable 39 (see FIGS. 3C and 9A). These two cables pass through watertight connectors 43 to maintain the overall waterproof capability of the entire component case assembly 15.

The component case assembly 15 that comprises the battery 12, the motor controller 13 and other electronics, is preferably mounted on the left bracket 16 so that the throttle cable 39 that connects to the thumb throttle 18 mounted on the left arm 2 is along a straight line and does not need to cross the wheelbarrow frame. Alternatively, if right sided control is desired, the thumb throttle 18 may be placed on the right arm of the wheelbarrow as long as provision is made to route the cable around the metal tub 4 and secure it appropriately to the wooden arms 2. The thumb throttle 18 must also be adapted to be operated by the appropriate thumb of the right hand. Left and right thumb throttles are thus typically mirror images of each other.

Motor controllers are designed to deliver and control tens of amps of current from the battery to the BLDC motor via solid state devices (FETs). During their normal operation the FETs generate heat. Accordingly, motor controllers need to be fitted with a heat sink to dissipate the heat generated by the FETs. In most cases, a single PC board contains all of the control circuitry and the main power FETs. The heat generating FETs are typically mounted to a heat sink or some other metallic structure that conducts the heat away during operation of the motor controller. Often, an aluminum enclosure for the PC board acts as the heat sink for the FETs mounted to the PC board.

Figure 8A:
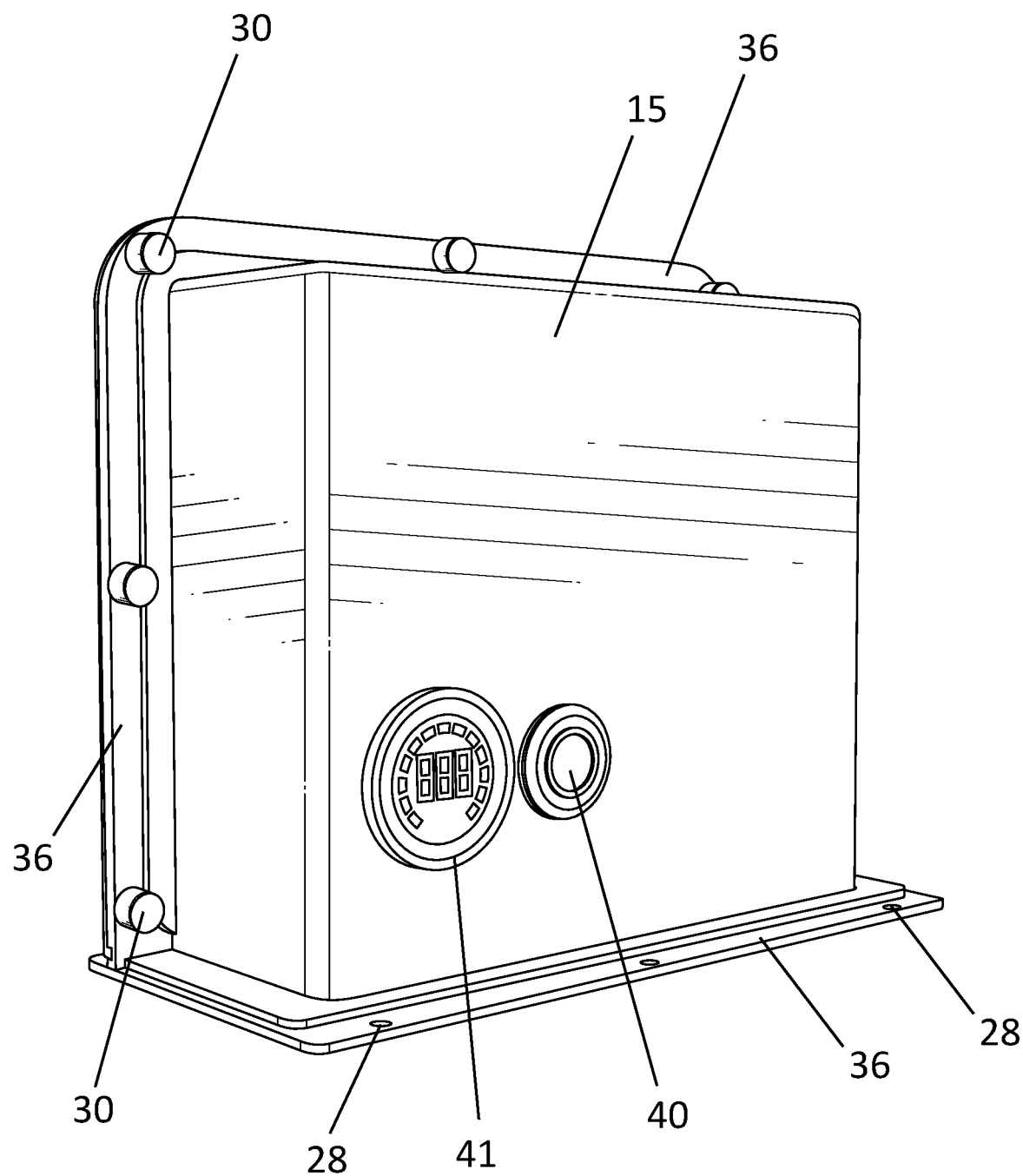
FIG. 8A is a perspective view of the case housing of the first embodiment, showing a side flange, a bottom flange, and internal components illustrated in simplified form.

In one embodiment of the invention, the aluminum enclosure for the PC board is omitted and the motor controller 13 (comprising the PC board, and the FETs) is mounted to the left bracket 16 so that the metal of the left bracket 16 is in direct contact with the motor controller 13. As a result, the left bracket 16 acts as the heat sink to conduct heat away from the motor controller 13 to the ambient environment. In another embodiment of the invention, the aluminum enclosure for the PC board is omitted and the FETs of the motor controller 13 are mounted to an intermediate aluminum strip 31. The intermediate aluminum strip 31 is in turn connected to the horizontal portion of left bracket 16 via the two threaded mounting holes 48 as shown in FIG. 8C. Accordingly, the metal of the left bracket 16 is in direct contact with the aluminum strip 31 having the FETs mounted thereon. As a result, left bracket 16 functions as the heat sink to dissipate heat produced by motor controller 13, and eliminates the need for a separate heat sink to dissipate the heat produced by motor controller 13.

The first embodiment shown in FIG. 8 has the aluminum strip 31 of motor controller 13 positioned so that it projects downward through the opening at the bottom of the case housing 26 where it attaches to the horizontal portion of left bracket 16.

Figure 9A:
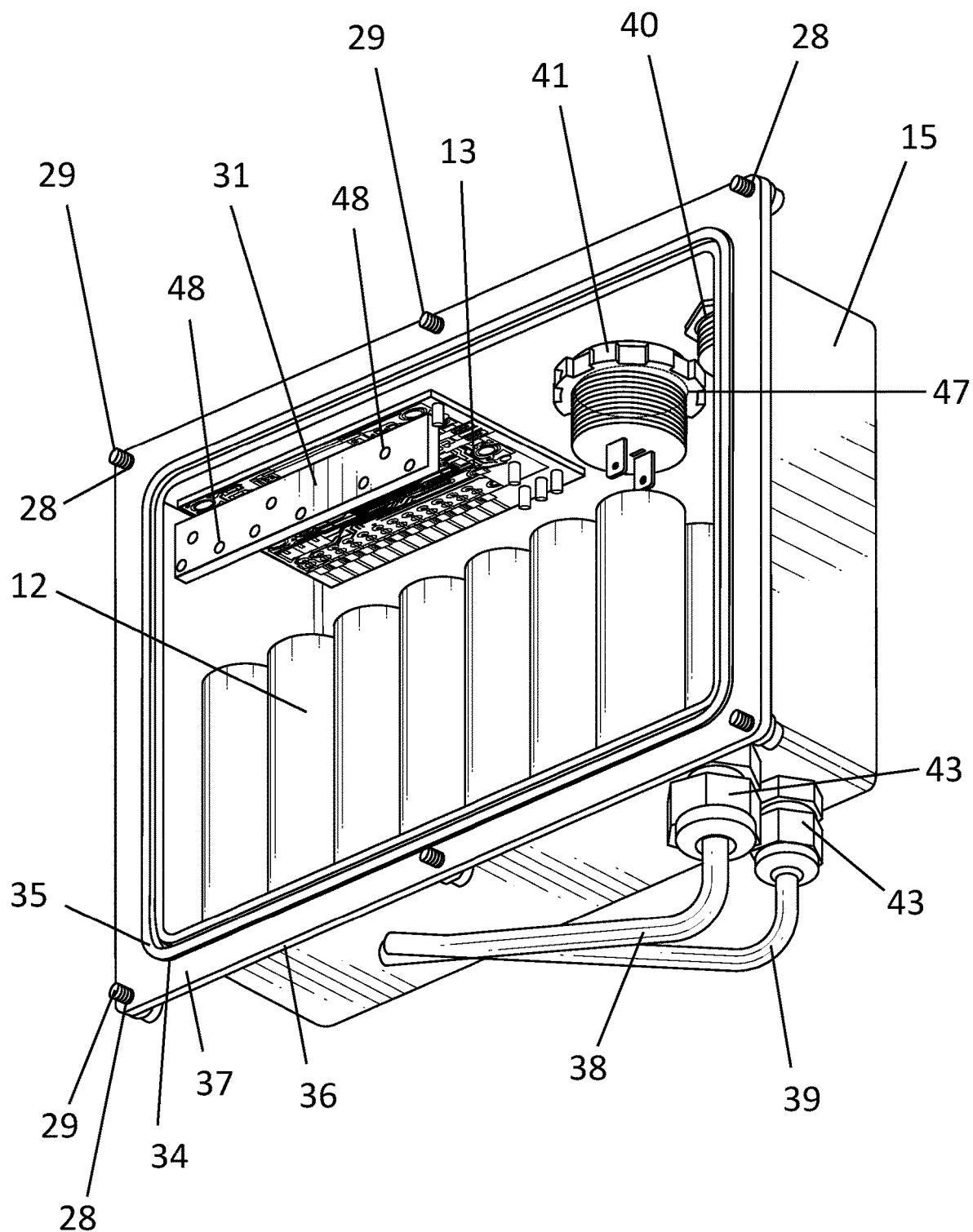
FIG. 9A is a perspective view of the case housing of the second embodiment, showing a closed bottom and an open side with the battery and other internal components, such as the motor controller, the side gasket, and motor and throttle cables that exit from the bottom of the case housing.

In the second embodiment shown in FIG. 9A, the motor controller 13 mounts to the vertical portion of the left bracket 16. It is mounted via screws that pass through one or more of the accessory holes 27 in the left bracket 16 and insert into one or more of the pre-threaded strip mounting holes 48 in the aluminum strip 31 of the motor controller 13.

In the first embodiment of the case and bracket shown in FIG. 8, the accessories to the motor controller 13 and battery 12, may also include a MOSFET based power switch 33. Because the motor controller can draw substantial current from batteries, i.e. 10-20 Amps, a conventional ON/OFF switch with metallic contacts would quickly burn out after a few cycles of operation. To avoid this complication, a solid-state switch consisting of MOSFET transistors is used to turn the power on to the motor controller. This switch is controlled by the application of DC voltage but draws minimal current, and can thus be operated using a conventional push button switch with metal contacts. Like the FETs of the motor controller 13, the MOSFETS of the solid-state power switch 33 also generate heat during operation and are thus placed in direct contact with the bracket 16 heat dissipation. The opening in the bottom of the case housing 26 is therefore provided for mounting the motor controller 13, the power switch 33, and any other electronics that may need a heat sink, directly to the bracket 16. In this embodiment, aluminum strip 31 of controller 13 is located in direct contact with bracket 16.

In the second embodiment shown in FIG. 9; the preferred embodiment; the battery comprises a switched battery management system (BMS), which effects the same function as the power switch 33. The battery can be switched on and off internally, and the ON/OFF switch 40 thus carries only the minimal current needed to operate the BMS. Accordingly, the second embodiment shown in FIG. 9 does not comprise the power switch 33.

Because the component case assembly 15 needs to be watertight, the case housing 26 is provided with flanges 36 around all of its openings. These flanges containing grooves 34 that accept a gasket 35. The gasket 35 seals the perimeter of the opening in case housing 26 against the bracket 16 when tightened down with screws 29 that pass-through bracket mounting holes 28 and thread into case mounting holes 19 in bracket 16 (see FIGS. 8 and 9).

Figure 8B:
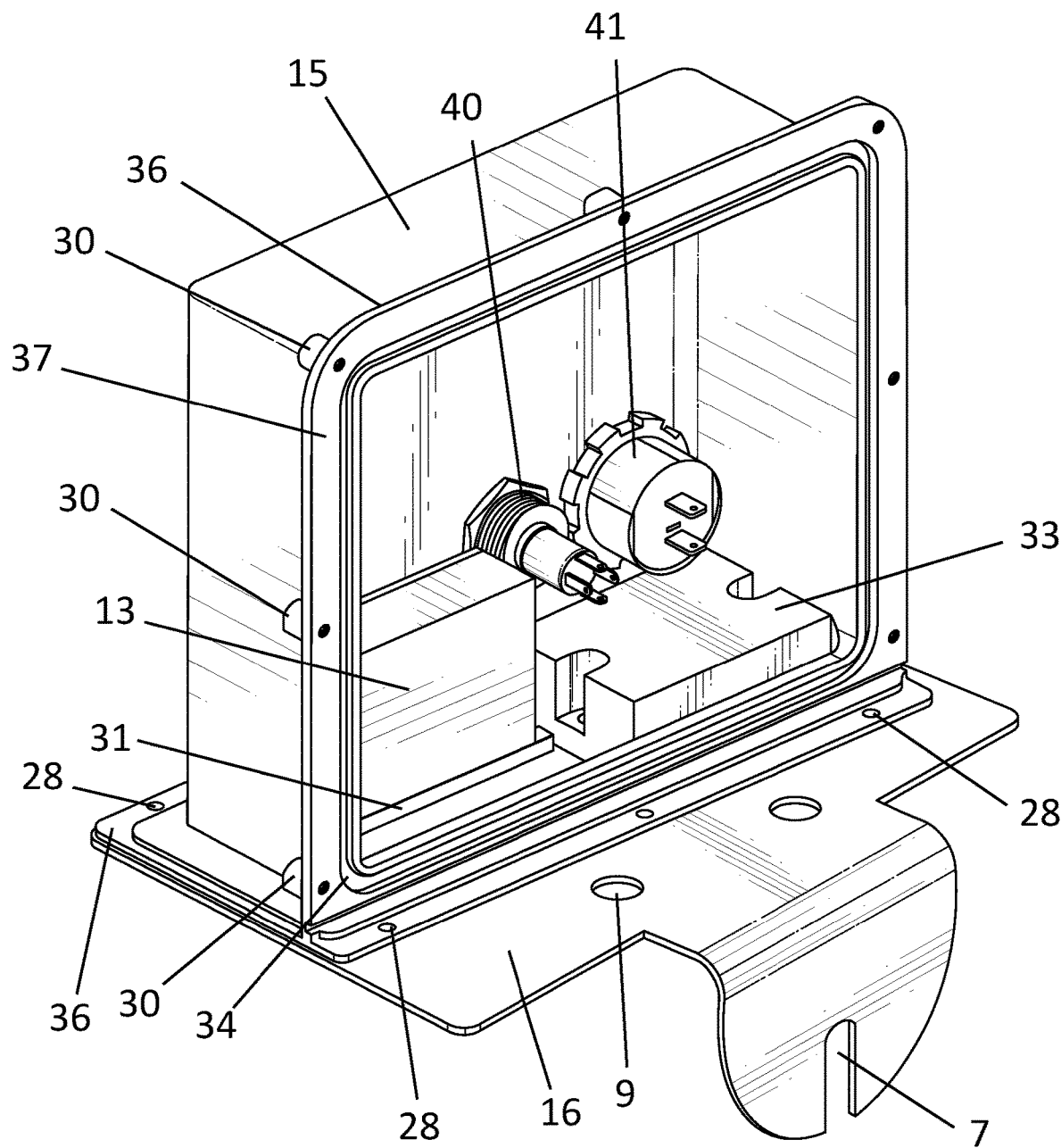
FIG. 8B is a perspective view of the case housing of the first embodiment, positioned on the left bracket. The case housing lid and the battery are not illustrated in order to better reveal the internal components, the lid mounting holes and the groove for the gasket. Note that some of the components mount directly to the bracket for ease of heat dissipation.
Figure 8C:
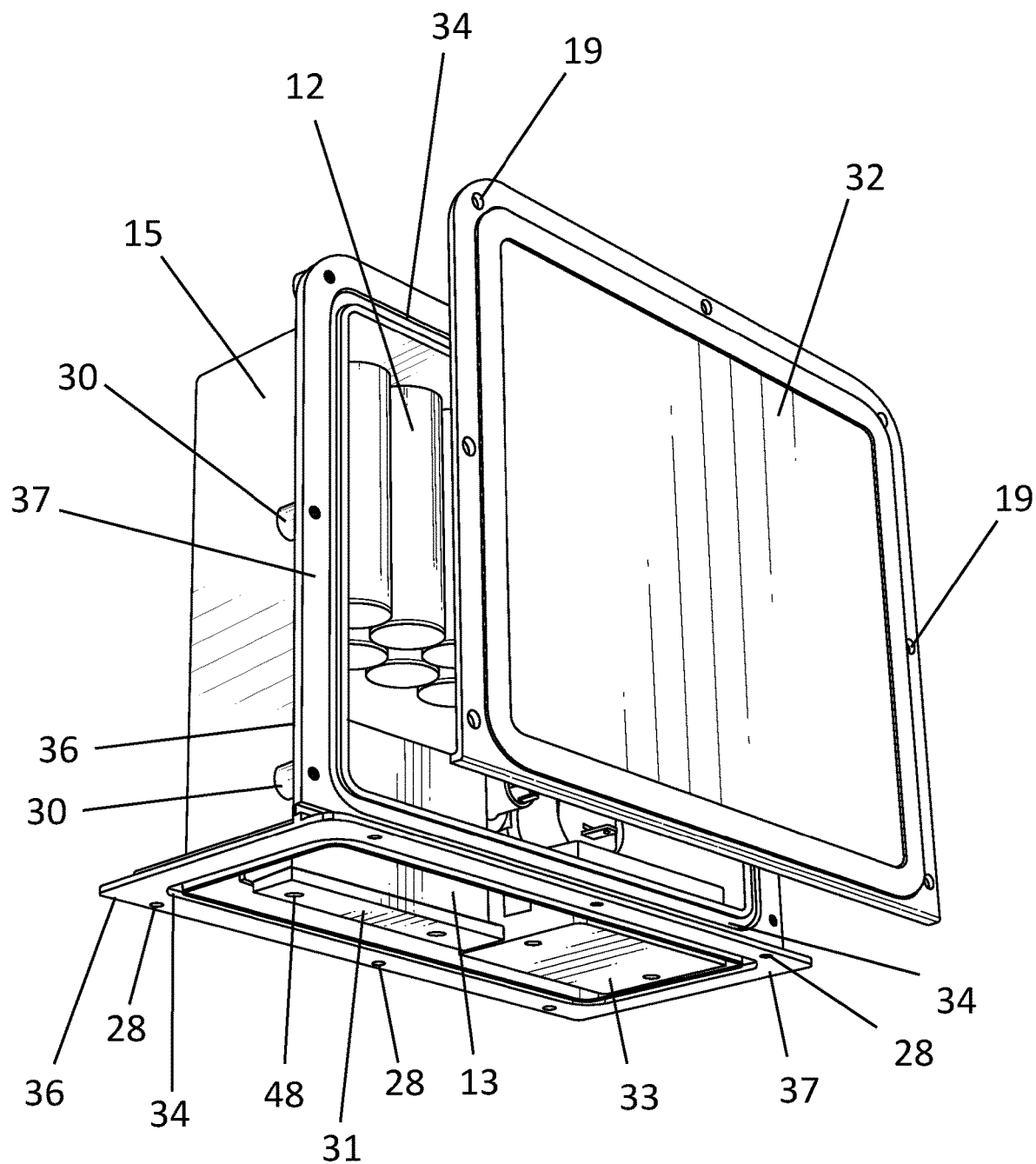
FIG. 8C is a perspective view of the case housing of the first embodiment and the case lid from the bottom side aspect, showing the bottom opening in the case housing and its flange, allowing some of the internal components to mount directly onto the bracket for ease of heat dissipation.

In addition to the opening at its bottom, the case housing 26 may also have an opening on its side for the assembly of the components, that accepts a lid (see FIGS. 8B and 8C). The groove 34 may therefore be positioned along the bottom edge of the case housing 26, as well as along the mating surfaces 37, where it mates with the case lid 32.

The case may have blind holes or bosses 30 (see FIG. 8A) into which screws 29 thread after passing through the case mounting holes 19 in the case lid 32, thus securing the case lid 32 to the case housing 26. In an alternative embodiment, the bosses 30 may replace the bracket mounting holes 28 in the flanges 36, and accept screws 29 that pass through case mounting holes 19 in bracket 16 in the opposite direction from the previous embodiment, and thread into the bosses 30, thus securing the bracket 16 to the case housing 26.

In the preferred embodiment shown in FIG. 9, the case housing 26 has a single opening, needs a single gasket 35, and mounts directly against the left bracket 16.

Figure 9B:
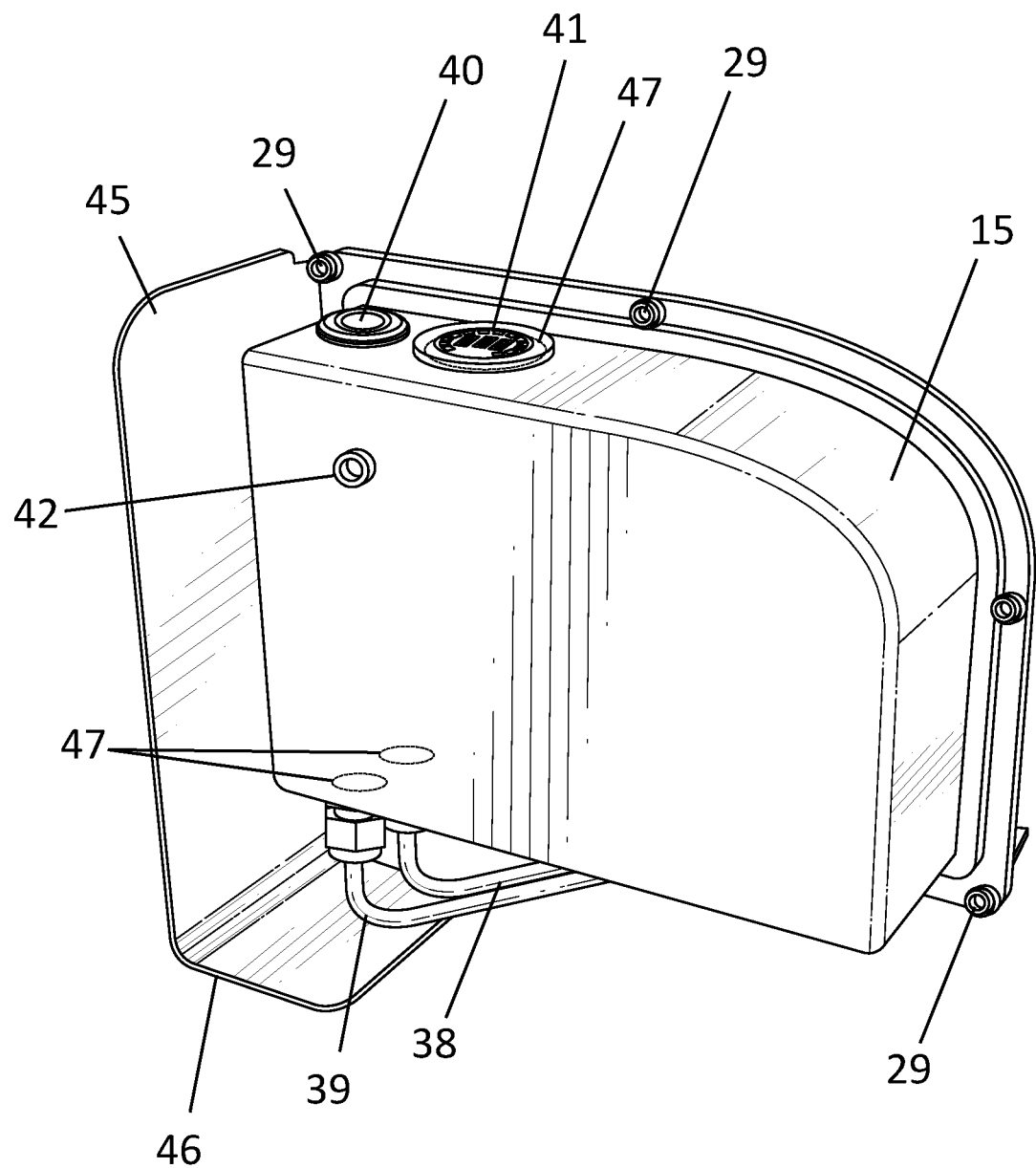
FIG. 9B is a left perspective view of the case housing of the second embodiment, modified to have a more rounded shape, showing the ON/OFF switch, the power meter, the charging port, the motor and throttle cables, and the left bracket affixed to the case housing.

Besides the battery 12, the motor controller 13, and the optional MOSFET 33, the case housing may also comprise the ON/OFF switch 40, a battery capacity meter 41, the charging port 42 and other accessories as may be necessary (see FIGS. 8A and 9B).

Some components, such as the On/Off switch 40, the battery capacity meter 41, and the motor cable 38 and the thumb throttle cable 39 may pass through component holes 47 in the bottom of the case (see FIG. 9B) and, in the first embodiment, through component holes in bracket 16, that are fitted with water-tight connectors 43 so that the entire system can be subjected to rain or washing with a water hose in the event that the wheelbarrow needs to be cleaned.

According to a first embodiment of the invention, as shown in FIG. 8B, the left bracket 16 may be a simple angle bracket with one bend, with the case mounted on its horizontal surface. In the preferred embodiment shown in FIGS. 2-6, and 9, the left bracket 16 may have additional bends and a vertical plate 45 that provide additional protection for the case housing 26 against damage in the event the wheelbarrow is accidentally rammed against an object from the front.

As also shown in FIGS. 2-6, and 9B, the left bracket 16 may have an additional strip of metal 46 positioned underneath the component case assembly 15, protecting the areas where the motor cable 38 and the throttle cable 39 exit.

It should be appreciated that the present invention may be implemented in alternative configurations so it can be adapted to versions of existing non-powered wheelbarrows that are not illustrated herein. For example, dimensions and mounting locations may be modified from those illustrated herein.

It should also be appreciated that while the illustrated embodiments show the component case assembly 15 mounted on the left side of the wheelbarrow, the conversion kit 10 may be easily adapted to function equally well with the component case assembly 15 mounted on the right side of the wheelbarrow. Those skilled in the art would understand that complete or partial mirror images of the component case assembly 15 and the brackets 16 and 17 would be sufficient to enable the forgoing embodiment with component case assembly 15 mounted on the right side of the wheelbarrow.

It should also be appreciated that while the illustrated embodiments show two mounting brackets, a single bracket with sufficient rigidity can be used to suspend the motorized wheel and the component case assembly. Those skilled in the art would see that motorcycles often have a single swing arm to position the rear wheel. A single mounting bracket on one side of the wheelbarrow can thus be adapted to achieve a similar configuration.

Throughout this specification, like reference numbers signify the same elements throughout the description of the figures.

The foregoing description of the subject matter has been provided for illustration and description purposes only. The description is not intended to be exhaustive or to limit the subject matter to only the form disclosed above. Other modifications and variations may be possible in view of the above teachings. The preferred embodiments were selected and described in order to best explain the principles of the invention and its application, and to enable others skilled in the art to make use of the invention in the various embodiments and modifications as may be suitable for their use. The appended claims are intended to include other alternative embodiments that may be suitable for the intended use, except as limited by the prior art.

What is claimed is:

1. An electric wheelbarrow conversion kit for converting an existing manual hand push wheelbarrow to a powered wheelbarrow, the kit comprising:
    a motorized wheel including an electric motor that is an integrated component of the motorized wheel;
    a motor controller for controlling the electric motor;
    a speed control input device electrically connected to the motor controller;
    a battery for powering the motor;
    a case; and
    one or more mounting brackets having mounting holes or mounting slots for mounting the case thereto.

2. The electric wheelbarrow conversion kit of claim 1, wherein the case houses the motor controller.

3. The electric wheelbarrow conversion kit of claim 2, wherein one of said mounting brackets functions as a heat sink.

4. The electric wheelbarrow conversion kit of claim 3, wherein said mounting bracket functions as the heat sink for the motor controller.

5. The electric wheelbarrow conversion kit of claim 4, wherein the motor controller includes an aluminum strip that is located in direct contact with the mounting bracket that functions as the heat sink.

6. The electric wheelbarrow conversion kit of claim 1, wherein the mounting holes or mounting slots are spaced apart by about two and three eighths inches.

7. The electric wheelbarrow conversion kit of claim 1, wherein each of the one or more mounting brackets have two mounting holes or mounting slots, said mounting holes or mounting slots spaced apart by about three inches.

8. The electric wheelbarrow conversion kit of claim 1, wherein each of the one or more mounting brackets have three mounting holes or mounting slots, wherein the first and third mounting holes or mounting slots are spaced apart by about 3 inches and the first and second mounting holes or mounting slots are spaced apart by about two and three eighths inches.

9. The electric wheelbarrow conversion kit of claim 1, wherein the case houses the battery.

10. The electric wheelbarrow conversion kit of claim 1 where one of said mounting brackets has metal faces to protect said case mounted thereto from impact damage.

11. The electric wheelbarrow conversion kit of claim 1, wherein the speed control input device is mountable to a handle of the existing manual hand push wheelbarrow, said speed control input device having a mounting surface with a plurality of projections for gripping the handle with increased friction.

12. The electric wheelbarrow conversion kit of claim 1, wherein the electric motor of the motorized wheel is a hub motor comprised of a stator having a stationary motor shaft and a rotor fitted with a tire, the stationary motor shaft mountable to at least a first bracket.

13. The electric wheelbarrow conversion kit of claim 12, wherein the first bracket is mountable to a wheelbarrow arm.

14. The electric wheelbarrow conversion kit of claim 12, wherein the kit includes the first bracket and a second bracket for mounting the stationary motor shaft to respective first and second wheelbarrow arms, each of the first and second brackets having a shaft slot, wherein the stationary motor shaft is fitted into the shaft slots formed in each of the first and second brackets.

15. An electric wheelbarrow conversion kit for converting an existing manual hand push wheelbarrow to a powered wheelbarrow, the kit comprising:
- a motorized wheel including an electric motor;
- a motor controller for controlling the electric motor;
- a speed control input device electrically connected to the motor controller;
- a battery for powering the motor;
- a case for housing the motor controller; and
- one or more mounting brackets having mounting holes or mounting slots for mounting the case thereto, wherein one of said mounting brackets functions as a heat sink for the motor controller, the motor controller including an aluminum strip that is located in direct contact with the mounting bracket that functions as the heat sink.

16. An electric wheelbarrow conversion kit for converting an existing manual hand push wheelbarrow to a powered wheelbarrow, the kit comprising:
- a motorized wheel including an electric motor;
- a motor controller for controlling the electric motor;
- a speed control input device electrically connected to the motor controller;
- a battery for powering the motor;
- a case for housing the motor controller; and
- one or more mounting brackets having mounting holes or mounting slots for mounting the case thereto, wherein the mounting holes or mounting slots are spaced apart by about two and three eighths inches.

\* \* \* \* \*